(12) United States Patent
Kenney et al.

(10) Patent No.: US 10,155,884 B2
(45) Date of Patent: Dec. 18, 2018

(54) 3D PRINTING METHOD UTILIZING A PHOTOCURABLE SILICONE COMPOSITION

(71) Applicant: Dow Corning Corporation, Midland, MI (US)

(72) Inventors: James Andrew Kenney, East Jordan, MI (US); Bizhong Zhu, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 69 days.

(21) Appl. No.: 15/508,940

(22) PCT Filed: Sep. 17, 2015

(86) PCT No.: PCT/US2015/050620
§ 371 (c)(1),
(2) Date: Mar. 6, 2017

(87) PCT Pub. No.: WO2016/044547
PCT Pub. Date: Mar. 24, 2016

(65) Prior Publication Data
US 2017/0283655 A1   Oct. 5, 2017

Related U.S. Application Data

(60) Provisional application No. 62/051,603, filed on Sep. 17, 2014.

(51) Int. Cl.
| | | |
|---|---|---|
| *C09D 183/04* | (2006.01) | |
| *C09D 183/08* | (2006.01) | |
| *C08G 77/28* | (2006.01) | |
| *C08G 77/12* | (2006.01) | |
| *C08G 77/20* | (2006.01) | |
| *B29K 83/00* | (2006.01) | |
| *C08K 3/36* | (2006.01) | |
| *C08L 83/04* | (2006.01) | |
| *C08L 83/08* | (2006.01) | |
| *B33Y 10/00* | (2015.01) | |
| *B33Y 70/00* | (2015.01) | |
| *B33Y 80/00* | (2015.01) | |
| *B29C 64/106* | (2017.01) | |
| *B29C 67/00* | (2017.01) | |
| *C08G 77/04* | (2006.01) | |
| *C08G 77/08* | (2006.01) | |
| *C08G 77/00* | (2006.01) | |

(52) U.S. Cl.
CPC .......... *C09D 183/04* (2013.01); *B29C 64/106* (2017.08); *B29C 67/0055* (2013.01); *B33Y 10/00* (2014.12); *B33Y 70/00* (2014.12); *B33Y 80/00* (2014.12); *C08G 77/04* (2013.01); *C08G 77/08* (2013.01); *C08G 77/28* (2013.01); *C08L 83/04* (2013.01); *C08L 83/08* (2013.01); *C09D 183/08* (2013.01); *B29K 2083/00* (2013.01); *C08G 77/12* (2013.01); *C08G 77/20* (2013.01); *C08G 77/80* (2013.01); *C08K 3/36* (2013.01)

(58) Field of Classification Search
CPC ... B29C 64/106; B29C 67/0055; C08G 77/28; C08G 77/08; C08G 77/04; C08G 77/12; C08G 77/20; C08G 77/80; C08L 83/04; C08L 83/08; B33Y 80/00; B33Y 10/00; B33Y 70/00; C09D 183/04; C09D 183/08; B29K 2083/00; C08K 3/36
USPC .................................................. 264/496, 494
See application file for complete search history.

(56) References Cited

U.S. PATENT DOCUMENTS

| | | |
|---|---|---|
| 4,260,780 A | 4/1981 | West |
| 4,276,424 A | 6/1981 | Peterson, Jr. et al. |
| 4,314,956 A | 2/1982 | Baney et al. |
| 4,324,901 A | 4/1982 | West et al. |
| 4,510,094 A | 4/1985 | Drahnak |
| 4,530,879 A | 7/1985 | Drahnak |

(Continued)

FOREIGN PATENT DOCUMENTS

| | | |
|---|---|---|
| EP | 0562922 A1 | 3/1993 |
| WO | WO2014108364 A1 | 7/2014 |
| WO | WO2015069454 A1 | 5/2015 |

OTHER PUBLICATIONS

PCT/US2015/050620 International Search Report dated Feb. 15, 2016, 7 pages.

(Continued)

*Primary Examiner* — William K Cheung
(74) *Attorney, Agent, or Firm* — Warner Norcross & Judd LLP

(57) ABSTRACT

A method of forming a three-dimensional (3D) article comprises the steps of I) printing a first photocurable silicone composition with a 3D printer to form a layer, II) irradiating the layer with an energy source to form an at least partially cured layer, III) printing a second photocurable silicone composition on the at least partially cured layer with the 3D printer to form a subsequent layer, and IV) irradiating the subsequent layer with the energy source to form an at least partially cured subsequent layer. Optionally, steps III) and IV) can be repeated with independently selected photocurable silicone compositions for any additional layer(s) to form the 3D article. The first and second photocurable silicone compositions are the same as or different from one another. Various pho-tocurable silicone compositions can be utilized for the inventive method, including the inventive photocurable silicone compositions described herein.

20 Claims, No Drawings

(56) References Cited

U.S. PATENT DOCUMENTS

| | | | |
|---|---|---|---|
| 4,568,566 | A | 2/1986 | Tolentino |
| 5,204,055 | A | 4/1993 | Sachs et al. |
| 5,340,898 | A | 8/1994 | Cavezzan et al. |
| 5,387,380 | A | 2/1995 | Cima et al. |
| 5,407,474 | A | 4/1995 | Airey et al. |
| 5,496,961 | A | 3/1996 | Dauth et al. |
| 5,738,976 | A | 4/1998 | Okinoshima et al. |
| 5,959,038 | A | 9/1999 | Furukawa et al. |
| 2005/0046957 | A1 | 3/2005 | Lai et al. |
| 2009/0147367 | A1 | 6/2009 | Blondal et al. |
| 2014/0257518 | A1* | 9/2014 | McAlpine ............... A61L 27/14 623/24 |

OTHER PUBLICATIONS

Hart, John, "Additive Manufacturing", PowerPoint presentation, Dec. 2, 2013, 16 pages.
"Standard Terminology for Additive Manufacturing Technologies", ASTM International, West Conshohocken, PA, Sep. 9, 2013, 3 pages.
Nuyken, Oskar and Pask, Stephen D., "Ring-Opening Polymerization—An Introductory Review", Polymers, 2013, 5, 361-403, 43 pages.
Compilation of SciFinder abstracts, 11 pages.

* cited by examiner

3D PRINTING METHOD UTILIZING A PHOTOCURABLE SILICONE COMPOSITION

CROSS-REFERENCE TO RELATED APPLICATIONS

This application is the National Stage of International Application No. PCT/US2015/050620 filed on 17 Sep. 2015, which claims priority to and all advantages of U.S. Patent Application No. 62/051,603 filed on 17 Sep. 2014, the content of which is hereby incorporated by reference.

FIELD OF THE INVENTION

The present invention generally relates to method of forming an article and, more specifically, to a method of forming a three-dimensional (3D) article utilizing a photocurable silicone composition, to a 3D article formed thereby, and to photocurable silicone compositions utilized therefor.

BACKGROUND OF THE INVENTION 3D printing or additive manufacturing (AM) is a process of making 3D solid objects, typically from a digital file. The creation of a 3D printed object is achieved using additive processes rather than subtractive processes. In an additive process, an object is created by laying down successive layers of material until the entire object is created. Each of these layers can be seen as a thinly sliced horizontal cross-section of the eventual object.

Additive processes have been demonstrated with certain limited types of materials, such as organic thermoplastics (e.g. polylactic acid (PLA) or acrylonitrile butadiene styrene (ABS)), plaster, clay, room temperature vulcanization (RTV) materials, paper, or metal alloys. These materials are unsuitable in certain end applications based on physical or chemical limitations, cost, slow solidification (or cure) times, improper viscosity, etc.

In view of the foregoing, there remains an opportunity to provide improved methods of forming 3D articles as well as an opportunity to provide improved materials suitable for 3D printing.

BRIEF SUMMARY OF THE INVENTION

Disclosed is a method of forming a three-dimensional (3D) article ("method"). The method comprises the steps of I) printing a first photocurable silicone composition with a 3D printer to form a layer, and II) irradiating the layer with an energy source to form an at least partially cured layer. The method further comprises the steps of III) printing a second photocurable silicone composition on the at least partially cured layer with the 3D printer to form a subsequent layer, and IV) irradiating the subsequent layer with the energy source to form an at least partially cured subsequent layer. Optionally, steps III) and IV) can be repeated with independently selected photocurable silicone compositions for any additional layer(s) to form the 3D article. The first and second photocurable silicone compositions are the same as or different from one another.

Also disclosed is a photocurable silicone composition ("composition"). In one embodiment, the composition comprises: A) an organosilicon compound having an average of at least two silicon-bonded ethylenically unsaturated groups per molecule, wherein ethylenically unsaturated moieties of the silicon-bonded ethylenically unsaturated groups are separated by at least four atoms; B) an organosilicon compound having an average of at least two silicon-bonded hydrogen atoms per molecule in an amount sufficient to cure the photocurable silicone composition; and C) a catalytic amount of a photoactivated hydrosilylation catalyst. Optionally, the composition may further comprise D) a filler.

In another embodiment, the composition comprises: A) an organosilicon compound having an average of at least two silicon-bonded ethylenically unsaturated groups and at least one silicon-bonded phenyl group per molecule, wherein a silicon atom bearing an ethylenically unsaturated group and a silicon atom bearing a phenyl group are separated by only an oxygen atom; B) an organosilicon compound having an average of at least two silicon-bonded hydrogen atoms per molecule in an amount sufficient to cure the photocurable silicone composition; and C) a catalytic amount of a photoactivated hydrosilylation catalyst. Optionally, the composition may further comprise D) a filler.

In yet another embodiment, the composition comprises: A) an organosilicon compound having an average of at least two silicon-bonded ethylenically unsaturated groups per molecule; B) an organosilicon compound having an average of at least two sulfur-bonded hydrogen atoms per molecule in an amount sufficient to cure the photocurable silicone composition; and C) a catalytic amount of a photoactivated free radical initiator. Optionally, the composition may further comprise D) a filler.

A reaction product of the inventive composition, e.g. a 3D article formed according to the inventive method, is also disclosed. The reaction product comprises a reaction product of components A), B), and C). Optionally, the reaction product is formed in the presence of component D).

DETAILED DESCRIPTION

The term "about" as used herein serves to reasonably encompass or describe minor variations in numerical values measured by instrumental analysis or as a result of sample handling. Such minor variations may be in the order of plus or minus 0% to 10%, plus or minus 0% to 5%, or plus or minus 0% to 1%, of the numerical values.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "branched" as used herein describes a polymer with more than two end groups.

The term "comprising" is used herein in its broadest sense to mean and to encompass the notions of "include" and "consist of."

The term "ambient temperature" or "room temperature" refers to a temperature between about 20° C. and about 30° C. Usually, room temperature ranges from about 20° C. to about 25° C.

The use of "for example" or "such as" to list illustrative examples does not limit to only the listed examples. Thus, "for example" or "such as" means "for example, but not limited to" or "such as, but not limited to" and encompasses other similar or equivalent examples.

The term "substituted" as used in relation to another group, for example, a hydrocarbon group, means, unless indicated otherwise, one or more hydrogen atoms in the hydrocarbon group has been replaced with another substituent. Examples of such substituents include, for example, halogen atoms such as chlorine, fluorine, bromine, and iodine; halogen atom containing groups such as chloromethyl, perfluorobutyl, trifluoroethyl, and nonafluorohexyl;

oxygen atoms; oxygen atom containing groups such as (meth)acrylic and carboxyl; nitrogen atoms; nitrogen atom containing groups such as amines, amino-functional groups, amido-functional groups, and cyano-functional groups; sulphur atoms; and sulphur atom containing groups such as mercapto groups.

All viscosity measurements referred to herein were measured at 25° C. unless otherwise indicated.

An "organopolysiloxane" means a polymer or resin comprising multiple organosiloxane or polyorganosiloxane groups per molecule. Organopolysiloxane is intended to include polymers substantially containing only organosiloxane or polyorganosiloxane groups in the polymer chain, and polymers where the backbone contains both organosiloxane and/or polyorganosiloxane groups and organic polymer groups in the polymer chain. Such polymers may be homopolymers or copolymers, including, for example, block copolymers and random copolymers. Organopolysiloxane is also intended to include resins having a three-dimensional cross-linked network.

Disclosed is a method of forming a three-dimensional (3D) article ("method"). The 3D article is formed from independently selected photocurable silicone compositions ("composition"), which is also described below, along with various aspects relating to the 3D articles.

Method

The method comprises the step of I) printing a first photocurable silicone composition with a 3D printer to form a layer. Various types of 3D printers and/or 3D printing methodologies (i.e., "3D printing processes") can be used as described in detail below. As also described below, various types of photocurable silicone compositions can be utilized in the inventive method.

The first photocurable silicone composition is generally printed on a substrate such that the layer is formed on the substrate. The substrate is not limited and may be any substrate. The substrate typically can support the 3D article during its method of forming. However, the substrate may itself be supported, e.g. by a table or bed, such that the substrate itself need not have rigidity. The substrate may be rigid or flexible, and may be discontinuous or continuous in at least one of thickness and composition. The substrate may include a coating or other film such that the substrate is removable, e.g. peelable, from the 3D article. Alternatively, the 3D article may physically and/or chemically bond to the substrate such that the 3D article and the substrate are together. In one embodiment, the substrate may comprise a silicone, e.g. an already cured silicone, such that the substrate becomes integral with the 3D article. The substrate may be a mold or any other object or article.

The layer formed by printing the first photocurable silicone composition may have any shape and dimension. For example, the layer need not be continuous, as in a conventional layer. The layer need not have a consistent thickness. Depending on a desired shape of the 3D article formed by the method, the layer may take any form.

The method further comprises the step of II) irradiating the layer with an energy source to form an at least partially cured layer. As used herein, "at least partially cured" means that curing of the silicone composition, in this case the first photocurable silicone composition, has been initiated, e.g. cross-linking of components has commenced. Cross-linking of the first photocurable silicone composition generally commences upon the application of radiation (e.g. visible light, UV light, IR light, X-rays, gamma rays, or e-beam), which is a curing condition for the first photocurable silicone composition. As understood in the art, the rate and mechanism with which the first photocurable silicone composition cures is contingent on various factors, including the components thereof, functional groups of the components, parameters of the curing condition, etc. "At least partially cured" encompasses any amount of cure upon application of the curing condition, from the formation of a single cross-link to a fully cross-linked state. Once irradiated, the layer generally begins to cure. Exothermic and/or applied heat may accelerate cure of the layer.

At least partial solidification of the layer is generally indicative of cure; however, cure may be indicated in other ways. For example, curing may be indicated by a viscosity increase, e.g. bodying, of the layer, an increased temperature of the layer, a transparency/opacity change of the layer, etc. While the resulting 3D article may generally be a solid while in a final cure state, the 3D article may also be in a state less than solid, such as in an elastomeric or gel state while in a final cure state. Curing is generally driven by cross-linking of reactive components in the photocurable silicone composition.

In certain embodiments, the at least partially cured layer substantially retains its shape upon exposure to ambient conditions. Ambient conditions refer to at least temperature, pressure, relative humidity, and any other condition that may impact a shape or dimension of the at least partially cured layer. For example, ambient temperature is room temperature.

By "substantially retains its shape," it is meant that a majority of the at least partially cured layer retains its shape, e.g. the at least partially cured layer does not flow or deform upon exposure to ambient conditions. "Substantially" may mean that at least about 50%, 60%, 70%, 80%, 90%, 95%, 96%, 97%, 98%, 99%, 99.5%, 99.9%, 99.99%, or at least about 99.999% or more of the volume of the at least partially cured layer is maintained in the same shape and dimension over a period of time, e.g. after 1 minute, 5 minutes, 10 minutes, 30 minutes, 1 hour, 4 hours, 8 hours, 12 hours, 1 day, 1 week, 1 month, etc. Said differently, substantially retaining shape means that gravity does not substantially impact shape of the at least partially cured layer upon exposure to ambient conditions. The shape of the at least partially cured layer may also impact whether the at least partially cured layer substantially retains its shape. For example, when the at least partially cured layer is rectangular or has another simplistic shape, the at least partially cured layer may be more resistant to deformation at even lesser levels of cure than at least partially cured layers having more complex shapes.

More specifically, prior to irradiation, the first photocurable silicone composition is generally flowable and may be in the form of a liquid, slurry, or gel, alternatively a liquid or slurry, alternatively a liquid. Viscosity of the first photocurable silicone composition can be adjusted depending on the type of 3D printer and its dispensing techniques and other considerations. Adjusting viscosity can be achieved, for example, by heating or cooling the first photocurable silicone composition, adjusting molecular weight of one or more components thereof, by adding or removing a solvent, carrier and/or diluent, by adding a filler or thixotropic agent, etc.

The method further comprises the step of III) printing a second photocurable silicone composition on the at least partially cured layer with the 3D printer to form a subsequent layer. The 3D printer may be the same as or different from the 3D printer utilized in step I). As described below, the second photocurable silicone composition may be the same as or different from the first photocurable silicone composition. The layer (or first, prior, or previous layer), subsequent layer (or second or latter layer), and any additional layer(s), optionally present as described below, are collectively referred to herein as "the layers." "The layers," as used herein in plural form, may relate to the layers at any stage of the inventive method, e.g. in an uncured state, in a partially cured state, in a final cure state, etc. The term "layer" in singular form designates the first layer printed with the first photocurable silicone composition.

As with the layer, the subsequent layer formed by printing the second photocurable silicone composition may have any shape and dimension. For example, the subsequent layer need not be continuous or have a consistent thickness. Further, the subsequent layer may differ from the layer in terms of shape, dimension, size, etc. The subsequent layer may only contact a portion of an exposed surface of the at least partially cured layer. For example, depending on the desired shape of the 3D article, the subsequent layer may build on the layer selectively.

In certain embodiments, printing of the subsequent layer occurs before the at least partially cured layer has reached a final cure state, i.e., while the at least partially cured layer is still "green." As used herein, "green" encompasses a partial cure but not a final cure state. The distinction between partial cure and a final cure state is whether the partially cured layer can undergo further curing or cross-linking. Functional groups may be present even in the final cure state, but may remain unreacted due to steric hindrance or other factors. In these embodiments, printing of the layers may be considered "wet-on-wet" such that the adjacent layers at least physically bond, and may also chemically bond, to one another. For example, it is possible that components in each of the layers chemically cross-link/cure across the print line. There may be certain advantages in having the cross-link network extend across the print line in relation to longevity, durability and appearance of the 3D article. The layers may also be formed around one or more substructures that can provide support or another function of the 3D article.

The layers can each be of various dimension including thickness and width. Thickness and/or width tolerances of the layers may depend on the 3D printing process used, with certain printing processes having high resolutions and others having low resolutions. Thicknesses of the layers can be uniform or may vary, and average thicknesses of the layers can be the same or different. Average thickness is generally associated with thickness of the layer immediately after printing. In various embodiments, the layers independently have an average thickness of from about 1 to 10,000, about 2 to about 1,000, about 5 to about 750, about 10 to about 500, about 25 to about 250, or about 50 to about 100, µm. Thinner and thicker thicknesses are also contemplated. This disclosure is not limited to any particular dimensions of any of the layers.

The method yet further comprises the step of IV) irradiating the subsequent layer with the energy source to form an at least partially cured subsequent layer. The step of IV) irradiating the subsequent layer may be the same as or different from the step of II) irradiating the layer in terms of the curing condition and associated parameters applied. Further, the step of IV) irradiating the subsequent layer may be the same as or different from the step of II) irradiating the layer in terms of the source of radiation utilized.

The energy source independently utilized for step II) and/or step IV) may emit various wavelengths across the electromagnetic spectrum. In various embodiments, the energy source emits at least one of ultraviolet (UV) radiation, infrared (IR) radiation, visible light, X-rays, gamma rays, or electron beams (e-beam). One or more energy sources may be utilized.

In certain embodiments, the energy source emits at least UV radiation. In physics, UV radiation is traditionally divided into four regions: near (400-300 nm), middle (300-200 nm), far (200-100 nm), and extreme (below 100 nm). In biology, three conventional divisions have been observed for UV radiation: near (400-315 nm); actinic (315-200 nm); and vacuum (less than 200 nm). In specific embodiments, the energy source emits UV radiation, alternatively actinic radiation. The terms of UVA, UVB, and UVC are also common in industry to describe the different wavelength ranges of UV radiation.

In certain embodiments, the radiation utilized to cure the layer(s) may have wavelengths outside of the UV range. For example, visible light having a wavelength of from 400 nm to 800 nm can be used. As another example, IR radiation having a wavelength beyond 800 nm can be used.

In other embodiments, e-beam can be utilized to cure the layer(s). In these embodiments, the accelerating voltage can be from about 0.1 to about 100 keV, the vacuum can be from about 10 to about $10^{-3}$ Pa, the electron current can be from about 0.0001 to about 1 ampere, and the power can vary from about 0.1 watt to about 1 kilowatt. The dose is typically from about 100 micro-coulomb/cm$^2$ to about 100 coulomb/cm$^2$, alternatively from about 1 to about 10 coulombs/cm$^2$. Depending on the voltage, the time of exposure is typically from about 10 seconds to 1 hour; however, shorter or longer exposure times may also be utilized.

Optionally, steps III) and IV) can be repeated for any additional layer(s) to form the 3D article. If steps III) and IV) are repeated, independently selected photocurable silicone compositions may be utilized in connection with each subsequent layer, which may be the same as or different from the first and/or second photocurable silicone compositions, as described below. The total number of layers required will depend, for example, on the size and shape of the 3D article, as well as dimensions of the individual and collective layers. One of ordinary skill can readily determine how many layers are required or desired using conventional techniques, such as 3D scanning, rendering, modeling (e.g. parametric and/or vector based modeling), sculpting, designing, slicing, manufacturing and/or printing software. In certain embodiments, once the 3D article is in a final cure state, the individual layers are generally not identifiable and the 3D article has a continuous and desirable aesthetic.

When the layers are applied wet-on-wet, and/or when the layers are only partially cured, the step of IV) irradiating may affect cure of more than just the subsequently printed layer. As noted above, because the cure may extend beyond or across the print line, and because a composite including the various layers is typically subjected to the curing condition, any other partially cured layers may also further, alternatively fully, cure upon a subsequent step of irradiating.

If desired, inserts, which may have varying shape, dimension, and be comprised of any suitable material, may be disposed or placed on or at least partially in any layer during the inventive method. For example, an insert may be utilized in between subsequent printing steps, and the insert may become integral with the 3D article upon its formation. Alternatively, the insert may be removed at any step during the inventive method, e.g. to leave a cavity or for other functional or aesthetic purposes. The use of such inserts may provide better aesthetics and economics over relying on printing alone.

Further, if desired, a composite including all or some of the layers may be subjected to a final cure step. For example, to ensure that the 3D article is at a desired cure state, a composite formed by printing and at least partially curing the layers may be subjected to a further step of irradiating. The final cure step, if desired, may be the same as or different from steps II) or IV) in terms of curing condition, associated parameters, and source of radiation utilized.

In various embodiments, the 3D printer is selected from a fused filament fabrication printer, a selective laser sintering printer, a selective laser melting printer, a stereolithography printer, a powder-bed (binder jet) printer, a material jet printer, a direct metal laser sintering printer, an electron beam melting printer, a laminated object manufacturing deposition printer, a directed energy deposition printer, a laser powder forming printer, a polyjet printer, an ink-jetting printer, a material jetting printer, and a syringe extrusion printer. The 3D printer may be independently selected during each printing step associated with the inventive method. Said differently, if desired, each printing step may utilize a different 3D printer. Different 3D printers may be utilized to impart different characteristics with respect to the layers, and different 3D printers may be particularly well suited for different types of photocurable silicone compositions.

In various embodiments, the 3D printer is selected from the group of powder-bed 3D printers, inkjet 3D printers, extrusion 3D printers, light-polymerized 3D printers, or combinations thereof. For example, the 3D printer can be a powder-bed and inkjet 3D printer. In certain embodiments, the 3D printer comprises at least one of a powder-bed 3D printer, an extrusion 3D printer, or a light-polymerized 3D printer. In specific embodiments, the 3D printer is a powder-bed and inkjet 3D printer, or an extrusion 3D printer. A printer of the former type is commonly associated with a binder jetting process, whereas a printer of the latter type is commonly associated with a material extrusion process. Light-polymerized 3D printers may combine any of the available material printing technologies, some described here, with a photocurable composition. They can be in any other forms of utilizing the photocurable behavior of a composition to deposit material layers, such as SLA, or stereolithography.

This disclosure generally incorporates ASTM Designation F2792-12a, "Standard Terminology for Additive Manufacturing Technologies," by reference in its entirety. Under this ASTM standard, "3D printer" is defined as "a machine used for 3D printing" and "3D printing" is defined as "the fabrication of objects through the deposition of a material using a print head, nozzle, or another printer technology." "Additive manufacturing (AM)" is defined as "a process of joining materials to make objects from 3D model data, usually layer upon layer, as opposed to subtractive manufacturing methodologies. Synonyms associated with and encompassed by 3D printing include additive fabrication, additive processes, additive techniques, additive layer manufacturing, layer manufacturing, and freeform fabrication." AM may also be referred to as rapid prototyping (RP). As used herein, "3D printing" is generally interchangeable with "additive manufacturing" and vice versa.

As for the various 3D printing processes described in the ASTM standard, "binder jetting" is defined as "an additive manufacturing process in which a liquid bonding agent is selectively deposited to join powder materials." "Material extrusion" is defined as "an additive manufacturing process in which material is selectively dispensed through a nozzle or orifice." "Material jetting" is defined as "an additive manufacturing process in which droplets of build material are selectively deposited." "Vat polymerization" is defined as "an additive manufacturing process in which liquid photopolymer in a vat is selectively cured by light-activated polymerization." "Stereolithography (SL)" is defined as "a vat photopolymerization process used to produce parts from photopolymer materials in a liquid state using one or more lasers to selectively cure to a predetermined thickness and harden the material into shape layer upon layer."

The method of this disclosure can mimic any one of the aforementioned 3D printing processes, or other 3D printing processes understood in the art. Specific examples of suitable 3D printing processes are also described in U.S. Pat. Nos. 5,204,055 and 5,387,380, the disclosures of which are incorporated by reference.

3D printing is generally associated with a host of related technologies used to fabricate physical objects from computer generated, e.g. computer-aided design (CAD), data sources. Some of these specific processes are included above with reference to specific 3D printers. Among these are stereolithography (SLA for stereolithography apparatus), selective laser sintering (SLS), fused deposition modeling (FDM), inkjet-based systems and three dimensional printing (3DP). Further, some of these processes, and others, are described in greater detail below.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however other file formats can also or additionally be used. The file is generally read into 3D printing software, which takes the file and optionally user input to separate it into hundreds, thousands, or even millions of "slices." The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of these slices may vary.

Regardless of the particular 3D printer and 3D printing process utilized in the method, ambient conditions may be manipulated or controlled. For example, if desired, the substrate may be heated before, during, and/or after the steps of printing to assist with curing. Further, the substrate could be moved, e.g. rotated, during any printing step. Typically, the 3D printer utilizes a dispenser, e.g. a nozzle or print head, for printing the particular photocurable silicone composition. Optionally, the dispenser may be heated before, during, and after dispensing the particular photocurable silicone composition. More than one dispenser may be utilized with each dispenser having independently selected properties. The method may be carried out in an irradiated environment such that curing initiates after each step of printing. Alternatively or in addition, a radiation source may be stationary or moveable relative to the 3D printer.

Binder Jetting

In various embodiments, the method of this disclosure mimics a conventional binder jetting process. Binder jetting, also referred to as "inkjet powder printing" or "drop-onpowder," generally works by spraying a liquid binder onto a bed of powder, solidifying it into a cross-section. In the method, and unlike conventional processes, the liquid binder comprises the first and/or second photocurable silicone composition(s) of this disclosure.

The print typically starts by using an automated roller to spread a first layer of powder onto a build platform which is associated with a build chamber. Powder is generally fed from a piston to ensure that the powder layer is densely packed while excess powder is brushed to the sides. Various types of powders can be used including, but not limited to, ceramic powder, metal powder, plastic powder, etc. In specific embodiments, the powder is ceramic powder.

A print head applies the liquid binder for the cross-section of the object. The liquid binder can be selectively deposited with the print head. The liquid binder may include one or more additives, such as pigments or dyes (for color printing), and/or additives to adjust viscosity, surface tension, etc. (to match print head specifications). The energy source, e.g. a UV light, can then be passed over or adjacent the layer formed by printing to initiate and/or further cure the layer to form the at least partially cured layer. The energy source can be attached directly to the print head such that it immediately follows deposition, e.g. for near/simultaneous irradiation, or can be separate from the print head, e.g. for delayed irradiation.

The process then repeats itself, followed by the next layer of powder being spread onto the build platform. Repeating the process builds up the object one layer at a time. Each layer of powder generally adheres to the last via the liquid binder while the binder cures. Supports are rarely required with this type of 3D printing as each horizontal slice is supported by the excess powder material below.

When the print is finished, loose/unbound powder generally surrounds and supports the object in the build chamber. After initially removing the powder from the finished object, any excess can be blown off using pressurized air. This is typically referred to as "de-powdering" and the object is typically still "green" until cure of the binder is complete. The leftover powder may be reused to form another object.

The different combinations available for pairing powder material with the binder allows for a wide range of material properties. In addition, binder jetting generally has less noticeable layer definitions, making it an ideal choice for producing end-use products.

Material Extrusion

In various embodiments, the method of this disclosure mimics a conventional material extrusion process. Material extrusion generally works by extruding material through a nozzle to print one cross-section of an object, which may be repeated for each subsequent layer. In the method, and unlike conventional processes, the material comprises the first and/or second photocurable silicone composition(s) of this disclosure. The nozzle may be heated to aid in dispensing the particular photocurable silicone composition. Further, the energy source, e.g. a UV light, may be passed over or adjacent the layer formed by printing to initiate and/or further cure the layer to form the at least partially cured layer. The energy source can be attached directly to the nozzle such that it immediately follows extrusion, e.g. for near/simultaneous irradiation, or can be separate from the nozzle, e.g. for delayed irradiation.

With this process, the material, i.e., the first and/or second photocurable silicone composition(s), is typically in the form of a slurry, gel, or paste during extrusion. The extruded material bonds to the layer below it during cure of the material. Repeating this process builds upon an object one layer at a time to ultimately form the 3D article. In certain embodiments, utilizing thinner cross-sections provides aesthetic and/or performance advantages with respect to the 3D article.

The nozzle and/or build platform generally moves in the X-Y (horizontal) plane before moving in the Z-axis (vertical) plane once each layer is complete. In this way, the object which becomes the 3D article is built one layer at a time from the bottom upwards. This process can use material for two different purposes, building the object and supporting overhangs in order to avoid extruding material into thin air.

If the object was printed using support material or rafts, after the printing process is complete, they are typically removed leaving behind the finished object. Optionally, post-processing steps can greatly improve the surface quality of even objects printed at low resolutions. Sanding is a common way to reduce or remove the visibly distinct layers of the model.

Material Jetting

In various embodiments, the method of this disclosure mimics a conventional material jetting process. Material jetting printers often resemble traditional paper printers, e.g. inkjet printers. In material jetting, a print head moves around a print area jetting the particular photocurable silicone composition. Energy sources, e.g. UV lights, surrounding the print head pass over or adjacent the photocurable silicone composition after it is jetted onto the build area and cures it, solidifying it in place. Repeating this process builds up the object one layer at a time. In the method, and unlike conventional processes, the photocurable material comprises the first and/or second photocurable silicone composition(s).

Stereolithography

In various embodiments, the method of this disclosure mimics a conventional stereolithography process. In various embodiments, a moveable table, or elevator, is placed initially at a position just below the surface of a vat filled with liquid photopolymer resin. In the method, and unlike conventional processes, the liquid photopolymer resin comprises the first and/or second photocurable silicone composition(s).

A laser beam is moved over the surface of the liquid photopolymer resin to trace the geometry of the cross-section of the object. This causes the resin to cure/harden in areas where the laser strikes. The laser beam is generally moved in the X-Y (horizontal) plane by a scanner system. These are typically very fast and highly-controllable motors which drive mirrors that "paint" the laser beam over the surface. The motors are generally guided by information from the computer generated data source or data that describes the cross-section of the object that is being made.

After the layer is completely traced and for the most part, substantially cured by the laser beam, the table is lowered into the vat a distance equal to the thickness of one layer. The resin is typically fairly viscous, however. To speed this process of recoating, early stereolithography systems drew a knife edge over the surface to smooth it. Pump-driven recoating systems are more common today for faster and more reliable operation. The tracing and recoating steps are repeated until the object is completely fabricated and sits on the table within the vat. Support structures may be manually added during the design process, but are usually added automatically by the system's software.

After the fabrication process is complete, the object is elevated from the vat and allowed to drain. Excess resin can be cleaned away. Optionally, the object is often given a final cure by bathing it in intense light in a box resembling an oven called a post-curing apparatus (PCA). After final cure, support structures are typically removed and surfaces are sanded or otherwise finished.

A process related to stereolithography is digital light processing (DLP). DLP is understood in the art, and the method of this disclosure can mimic it with use of the first and/or second photocurable silicone composition(s) in place of conventional resin.

Post-Process Options

Optionally, the resulting objects may be subjected to different post-processing regimes, such as further irradiation, infiltration, bakeout, and/or firing. This may be done, for example, to expedite cure of any binder, to reinforce the 3D article, eliminate any curing/cured binder (e.g., by decomposition), to consolidate the core material (e.g., by sintering/melting), and/or to form a composite material blending the properties of powder and binder. Some of these steps are especially useful for binder jetting processes and are understood by those of ordinary skill in the art.

In various embodiments, the method further comprises the step of heating a composite comprising the at least partially cured layers. Heating can be used to expedite cure. In various embodiments, the method further comprises the step of further irradiating a composite comprising the at least partially cured layers. Further irradiation can be used to expedite cure. In various embodiments, the method further comprises the step of firing a composite comprising ceramic powder dispersed in the reaction product of the photocurable silicone composition. Firing can be done at various temperatures and for various periods of time understood in the art.

Composition

The first and second photocurable silicone compositions may be the same as or different from one another, and when steps III) and IV) are repeated, independently selected photocurable silicone compositions may be utilized. For purposes of brevity, the first and second photocurable silicone composition, along with any other photocurable silicone compositions optionally utilized when steps III) and IV) are repeated, are referred to below collectively merely as "the photocurable silicone composition," "each of the photocurable silicone compositions," "at least one of the photocurable silicone compositions," or simply as the "composition" or "compositions." Reference to such terms or phrases may refer to any of the photocurable silicone compositions utilized in the method, and despite being referred to collectively each of the photocurable silicone compositions may be independently selected.

Various photocurable silicone compositions are described below. The first and second photocurable silicone compositions, along with any independently selected photocurable silicone compositions utilized to form additional layers when optionally repeating steps III) and IV), may be any silicone compositions which cure in the presence of the curing condition, i.e., radiation. Specific examples of photocurable silicone compositions suitable for the inventive method are disclosed below. In various embodiments, each of the photocurable silicone compositions is selected from those described below.

In certain embodiments, each of the photocurable silicone compositions is independently selected from hydrosilylation-curable or addition-curable silicone compositions. When additional independently selected photocurable silicone compositions are utilized in the method, such photocurable silicone compositions are typically independently selected from those set forth above. Notably, the first and second photocurable silicone compositions may have the same cure mechanism upon application of the curing condition, i.e., radiation, but may still be independently selected from one another. For example, the photocurable silicone compositions may differ from one another, e.g. by components, relative amounts thereof, etc.

In certain embodiments, the photocurable silicone compositions are the same as one another. In other embodiments, the photocurable silicone compositions are different from one another.

In certain embodiments, each of the photocurable silicone compositions utilized in the method cures via the same cure mechanism upon application of the curing condition, i.e., radiation. These embodiments easily allow for cure across the print line, if desired, as the components in each of the photocurable silicone compositions may readily react with one another in view of having the same cure mechanism upon application of the curing condition, i.e., radiation. In these embodiments, each of the photocurable silicone compositions may still be different from one another in terms of the actual components utilized and relative amounts thereof, even though the cure mechanism is the same in each of the photocurable silicone compositions.

In certain embodiments, the photoactivated curing mechanisms in each layer are different. For example, hydrosilylation reaction is the curing mechanism in one layer, while thiol-ene reaction is the curing mechanism in another layer.

In various embodiments, at least one of the photocurable silicone compositions comprises a hydrosilylation-curable silicone composition. In these embodiments, the hydrosilylation-curable silicone composition typically comprises (A) an organopolysiloxane having an average of at least two silicon-bonded ethylenically unsaturated groups or silicon-bonded hydrogen atoms per molecule; (B) an organosilicon compound having an average of at least two silicon-bonded hydrogen atoms or silicon-bonded ethylenically unsaturated groups per molecule capable of reacting with the silicon-bonded ethylenically unsaturated groups or silicon-bonded hydrogen atoms in the organopolysiloxane (A); and (C) a photoactivated hydrosilylation catalyst. When the organopolysiloxane (A) includes silicon-bonded ethylenically unsaturated groups, the organosilicon compound (B) includes at least two silicon-bonded hydrogen atoms per molecule, and when the organopolysiloxane (A) includes silicon-bonded hydrogen atoms, the organosilicon compound (B) includes at least two silicon-bonded ethylenically unsaturated groups per molecule. Typically, the silicon-bonded ethylenically unsaturated groups are alkenyl groups, e.g. vinyl groups. The organosilicon compound (B) may be referred to as a cross-linker or cross-linking agent.

The organopolysiloxane (A) and the organosilicon compound (B) may independently be linear, branched, cyclic, or resinous. In particular, the organopolysiloxane (A) and the organosilicon compound (B) may comprise any combination of M, D, T, and Q units. The symbols M, D, T, and Q represent the functionality of structural units of organopolysiloxanes. M represents the monofunctional unit $R^0{}_3SiO_{1/2}$. D represents the difunctional unit $R^0{}_2SiO_{2/2}$. T represents the trifunctional unit $R^0SiO_{3/2}$. Q represents the tetrafunctional unit $SiO_{4/2}$. Generic structural formulas of these units are shown below:

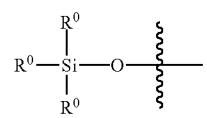

[M]

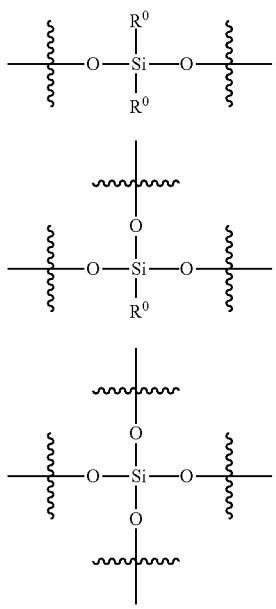

In these structures/formulae, each $R^0$ may be any hydrocarbon, aromatic, aliphatic, alkyl, alkenyl, or alkynl group.

The particular organopolysiloxane (A) and organosilicon compound (B) may be selected based on desired properties of the 3D article and layers during the inventive method. For example, it may be desirable for the layers to be in the form of an elastomer, a gel, a resin, etc., and selecting the components of the photocurable silicone composition allows one of skill in the art to achieve a range of desirable properties.

For example, in certain embodiments, one of the organopolysiloxane (A) and the organosilicon compound (B) comprises a silicone resin, which typically comprises T and/or Q units in combination with M and/or D units. When the organopolysiloxane (A) and/or organosilicon compound (B) comprises a silicone resin, the silicone resin may be a DT resin, an MT resin, an MDT resin, a DTQ resin, an MTQ resin, an MDTQ resin, a DQ resin, an MQ resin, a DTQ resin, an MTQ resin, or an MDQ resin. Generally, when the hydrosilylation-curable silicone composition comprises a resin, the layer(s) and resulting 3D article have increased rigidity.

Alternatively, in other embodiments, the organopolysiloxane (A) and/or the organosilicon compound (B) is an organopolysiloxane comprising repeating D units. Such organopolysiloxanes are substantially linear but may include some branching attributable to T and/or Q units. Alternatively, such organopolysiloxanes are linear. In these embodiments, the layer(s) and resulting 3D article are elastomeric.

The silicon-bonded ethylenically unsaturated groups and silicon-bonded hydrogen atoms of the organopolysiloxane (A) and the organosilicon compound (B), respectively, may independently be pendent, terminal, or in both positions.

In a specific embodiment, the organopolysiloxane (A) has the general formula:

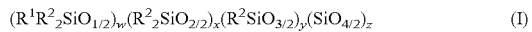

wherein each $R^1$ is an independently selected hydrocarbyl group, which may be substituted or unsubstituted, and each $R^2$ is independently selected from $R^1$ and an ethylenically unsaturated group, with the proviso that at least two of $R^2$ are ethylenically unsaturated groups, and w, x, y, and z are mole fractions such that w+x+y+z=1. As understood in the art, for linear organopolysiloxanes, subscripts y and z are generally 0, whereas for resins, subscripts y and/or z>0. Various alternative embodiments are described below with reference to w, x, y and z. In these embodiments, the subscript w may have a value of from 0 to 0.9999, alternatively from 0 to 0.999, alternatively from 0 to 0.99, alternatively from 0 to 0.9, alternatively from 0.9 to 0.999, alternatively from 0.9 to 0.999, alternatively from 0.8 to 0.99, alternatively from 0.6 to 0.99. The subscript x typically has a value of from 0 to 0.9, alternatively from 0 to 0.45, alternatively from 0 to 0.25. The subscript y typically has a value of from 0 to 0.99, alternatively from 0.25 to 0.8, alternatively from 0.5 to 0.8. The subscript z typically has a value of from 0 to 0.99, alternatively from 0 to 0.85, alternatively from 0.85 to 0.95, alternatively from 0.6 to 0.85, alternatively from 0.4 to 0.65, alternatively from 0.2 to 0.5, alternatively from 0.1 to 0.45, alternatively from 0 to 0.25, alternatively from 0 to 0.15.

In certain embodiments, each $R^1$ is a $C_1$ to $C_{10}$ hydrocarbyl group, which may be substituted or unsubstituted, and which may include heteroatoms within the hydrocarbyl group, such as oxygen, nitrogen, sulfur, etc. Acyclic hydrocarbyl and halogen-substituted hydrocarbyl groups containing at least 3 carbon atoms can have a branched or unbranched structure. Examples of hydrocarbyl groups represented by $R^1$ include, but are not limited to, alkyl groups, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl groups, such as cyclopentyl, cyclohexyl, and methylcyclohexyl; aryl groups, such as phenyl and naphthyl; alkaryl groups, such as tolyl and xylyl; and aralkyl groups, such as benzyl and phenethyl. Examples of halogen-substituted hydrocarbyl groups represented by $R^1$ include, but are not limited to, 3,3,3-trifluoropropyl, 3-chloropropyl, chlorophenyl, dichlorophenyl, 2,2,2-trifluoroethyl, 2,2,3,3-tetrafluoropropyl, and 2,2,3,3,4,4,5,5-octafluoropentyl.

The ethylenically unsaturated groups represented by $R^2$, which may be the same or different within the organopolysiloxane (A), typically have from 2 to 10 carbon atoms, alternatively from 2 to 6 carbon atoms, and are exemplified by, for example, alkenyl groups such as vinyl, allyl, butenyl, hexenyl, and octenyl.

In these embodiments, the organosilicon compound (B) may be further defined as an organohydrogensilane, an organopolysiloxane an organohydrogensiloxane, or a combination thereof. The structure of the organosilicon compound (B) can be linear, branched, cyclic, or resinous. In acyclic polysilanes and polysiloxanes, the silicon-bonded hydrogen atoms can be located at terminal, pendant, or at both terminal and pendant positions. Cyclosilanes and cyclosiloxanes typically have from 3 to 12 silicon atoms, alternatively from 3 to 10 silicon atoms, alternatively from 3 to 4 silicon atoms. The organohydrogensilane can be a monosilane, disilane, trisilane, or polysilane.

The photocurable silicone composition may be any silicone composition that is curable upon exposure to irradiation. As introduced above with the energy source, the irradiation may be any type of electromagnetic radiation, such as UV radiation, X-rays, gamma rays, electron beams, visible light, IR radiation, etc. As understood in the art, these types of electromagnetic radiation vary by at least wavelength. In certain embodiments, the composition is capable of curing upon irradiation from a lamp capable of emitting irradiation at a dosage of at least 0.001 mJ/cm$^2$, alternatively a dosage of from 0.01 to 2,000 mJ/cm$^2$, 0.1 to 1,000 mJ/cm$^2$, 1 to 1,000 mJ/cm$^2$, or 10 to 500 mJ/cm$^2$.

In a first embodiment of the composition, the composition comprises an organosiloxane. The organosiloxane generally includes an average of at least two silicon-bonded radiation-sensitive groups per molecule. As used herein, the term "radiation-sensitive group" means the group forms a reactive species, for example a free radical or cation, upon exposure to irradiation, optionally in the presence of a photoinitiator. The radiation-sensitive groups may be the same as or different from one another in a single molecule or between different molecules of the organosiloxane of the composition.

In the first embodiment, the composition may further comprise a compound reactive with the organosiloxane, e.g. an organosilicon compound, including another organosiloxane optionally having functionality reactive with the silicon-bonded radiation-sensitive groups. Alternatively, the silicon-bonded radiation-sensitive groups may be self-reactive. In these embodiments, the silicon-bonded radiation-sensitive groups of adjacent molecules may react and cross-link upon exposure to irradiation.

In the first embodiment, the composition may further comprise a photoinitiator, which is known in the art for catalyzing curing via irradiation. The photoinitiator may be, for example, a free radical or cationic photoinitiator, contingent on the other components of the composition.

In the first embodiment, the composition may further comprise a reactive compound other than the organosiloxane, e.g. an acrylate compound, such as a polyfunctional acrylate.

In the first embodiment, the composition may comprise a carrier vehicle or solvent, or may include a reactive diluent, e.g. a low molecular weight reactive component.

In the first embodiment, the composition may comprise a filler, which may be organic or inorganic, and may be of a variety of shapes and sizes. The filler may also be referred to as an organic particulate filler or as an inorganic particulate filler.

Specific examples of radiation-sensitive groups include, but are not limited to, acryloyloxyalkyl groups, substituted acryloyloxyalkyl groups, alkenyl ether groups, alkenyl groups, acrylate functional groups, epoxy functional groups, alkynyl groups, thiol substituted organic groups, silicon hydride groups, and epoxy-substituted organic groups. In various embodiments described further below, the composition is free of acrylate functional groups or epoxy functional groups.

Examples of suitable acryloyloxyalkyl groups include, but are not limited to, acryloyloxymethyl, 2-acryloyloxyethyl, 3-acryloyloxyypropyl, and 4-acryloyloxybutyl. Examples of suitable substituted acryloyloxyalkyl groups include, but are not limited to, methacryloyloxymethyl, 2-methacryloyloxyethyl, and 3-methacryloyloxylpropyl.

Examples of suitable alkenyl ether groups include, but are not limited to, a vinyl ether group having the formula and —O—R—O—CH=CH$_2$, wherein R is C$_1$ to C$_{10}$ hydrocarbylene or C$_1$ to C$_{10}$ halogen-substituted hydrocarbylene.

The hydrocarbylene groups represented by R typically have from 1 to 10 carbon atoms, alternatively from 1 to 6 carbon atoms, alternatively from 1 to 4 carbon atoms. Examples of hydrocarbylene groups include, but are not limited to, alkylene such as methylene, ethylene, propane-1,3-diyl, 2-methylpropane-1,3-diyl, butane-1,4-diyl, butane-1,3-diyl, pentane-1,5,-diyl, pentane-1,4-diyl, hexane-1,6-diyl, octane-1,8-diyl, and decane-1,10-diyl; cycloalkylene such as cyclohexane-1,4-diyl; arylene such as phenylene. Examples of halogen-substituted hydrocarbylene groups include, but are not limited to, divalent hydrocarbon groups wherein one or more hydrogen atoms have been replaced by halogen, such as fluorine, chlorine, and bromine, such as —CH$_2$CH$_2$CF$_2$CF$_2$CH$_2$CH$_2$—.

Specific examples of suitable ethylenically unsaturated groups include those having from 2 to 10 carbon atoms, alternatively from 2 to 6 carbon atoms. These ethylenically unsaturated groups are exemplified by alkenyl groups such as vinyl, allyl, butenyl, hexenyl, and octenyl. In specific embodiments, the alkenyl groups are vinyl or allyl, alternatively vinyl.

"Thiol substituted organic groups" are generally monovalent organic groups with a thiol group as the reactive site. Examples include, but are not limited to, thiolpropyl, thiolbutyl, thiocyclobutyl, and thiopentyl groups.

"Epoxy-substituted organic groups" are generally monovalent organic groups in which an oxygen atom, the epoxy substituent, is directly attached to two adjacent carbon atoms of a carbon chain or ring system. Examples of epoxy-substituted organic groups include, but are not limited to, 2,3-epoxypropyl, 3,4-epoxybutyl, 4,5-epoxypentyl, 2-glycidoxyethyl, 3-glycidoxypropyl, 4-glycidoxybutyl, 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3 epoxycylopentyl)propyl.

As introduced above, the organosiloxane typically contains an average of at least two silicon-bonded radiation-sensitive groups per molecule. Generally, at least 1, alternatively at least 10, alternatively at least 20, mol % of the silicon-bonded groups in the organosiloxane are radiation-sensitive groups. The term "mol % of the silicon-bonded groups in the organosiloxane are radiation-sensitive groups" is defined as the ratio of the number of moles of silicon-bonded radiation-sensitive groups in the organosiloxane to the total number of moles of the silicon-bonded groups in the organosiloxane, multiplied by 100.

Specific examples of suitable organosiloxanes include those having the following formulae:

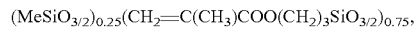

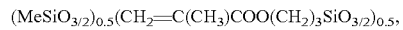

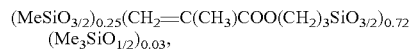

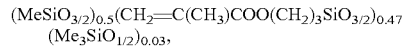

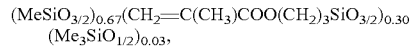

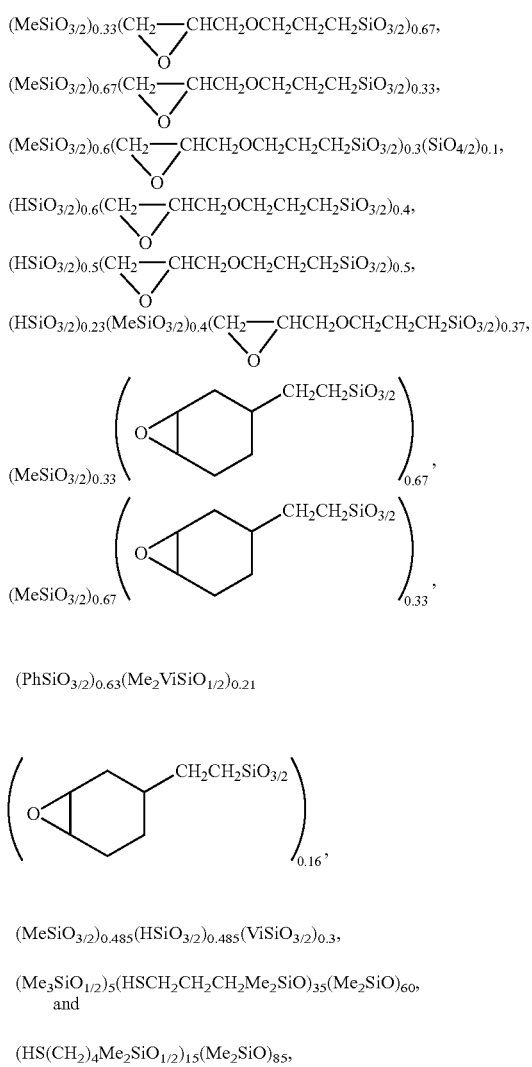

(PhSiO$_{3/2}$)$_{0.63}$(Me$_2$ViSiO$_{1/2}$)$_{0.21}$ $$\left(\begin{array}{c}\text{CH}_2\text{CH}_2\text{SiO}_{3/2}\\ \text{O}\end{array}\right)_{0.16},$$

(MeSiO$_{3/2}$)$_{0.485}$(HSiO$_{3/2}$)$_{0.485}$(ViSiO$_{3/2}$)$_{0.3}$, (Me$_3$SiO$_{1/2}$)$_5$(HSCH$_2$CH$_2$Me$_2$SiO)$_{35}$(Me$_2$SiO)$_{60}$,
and (HS(CH$_2$)$_4$Me$_2$SiO$_{1/2}$)$_{15}$(Me$_2$SiO)$_{85}$, where Me is methyl, Ph is phenyl, Vi is vinyl, and the numerical subscripts outside the parenthesis denote mole fractions or total siloxy units. Also, in the preceding formulae, the sequence of units in the particular organosiloxane is unspecified. In some embodiments, the organosiloxanes having silicone-bonded radiation sensitive groups do not contain acrylate or epoxy groups.

Methods of preparing organosiloxanes having silicon-bonded radiation-sensitive groups are understood in the art. For example, organosiloxanes containing silicon-bonded acryloyloxyalkyl or substituted acryloyloxyalkyl groups can be prepared by co-hydrolyzing an acryloyloxyalkyl- or substituted-acryloyloxyalkylalkoxysilane and an alkoxysilane in the presence of an acidic or basic catalyst, as exemplified in U.S. Pat. Nos. 5,738,976 and 5,959,038. Alternatively, such organosiloxanes can be produced by co-hydrolyzing an acryloyloxyalkyl- or substituted-acryloyloxayalkylchlorosilane and at least one chlorosilane, as taught in U.S. Pat. No. 4,568,566.

Any of the compositions may optionally and independently further comprise additional ingredients or components ("additives"), especially if the ingredient or component does not prevent the organosiloxane of the composition from curing. Examples of additional ingredients include, but are not limited to, adhesion promoters; dyes; pigments; anti-oxidants; carrier vehicles; heat stabilizers; flame retardants; thixotropic agents; flow control additives; inhibitors; fillers, including extending and reinforcing fillers; and cross-linking agents. In various embodiments, the composition further comprises ceramic powder. The amount of ceramic powder can vary and may depend on the 3D printing process being utilized.

One or more of the additives can be present as any suitable wt. % of the composition, such as about 0.1 wt. % to about 15 wt. %, about 0.5 wt. % to about 5 wt. %, or about 0.1 wt. % or less, about 1 wt. %, 2, 3, 4, 5, 6, 7, 8, 9, 10, 11, 12, 13, 14, or about 15 wt. % or more of the composition.

As introduced above, the composition may further comprise the photoinitiator, which may be a cationic, free radical photoinitiator, or a chelated metal compound depending on the radiation-sensitive groups of the organosiloxane. For instance, when the organosiloxane include silicon-bonded alkenyl ether or epoxy-substituted organic groups, the composition can further comprise at least one cationic photoinitiator. The cationic photoinitiator can be any cationic photoinitiator capable of initiating cure (cross-linking) of the organosiloxane upon exposure to irradiation. Examples of cationic photoinitiators include, but are not limited to, onium salts, diaryliodonium salts of sulfonic acids, triarylsulfonium salts of sulfonic acids, diaryliodonium salts of boronic acids, and triarylsulfonium salts of boronic acids.

The photoinitiator can be present as any suitable wt. % of the composition, such as about 0.1 wt. % to about 15 wt. %, about 0.5 wt. % to about 5 wt. %, or about 0.1 wt. % or less, about 1 wt. %, 2, 3, 4, 5, 6, 7, 8, 9, 10, 11, 12, 13, 14, or about 15 wt. % or more of the composition.

Suitable onium salts include salts having a formula selected from $R^*_2I^+MX_Z^-$, $R^*_3S^+MX_Z^-$, $R^*_3Se^+MX_Z^-$, $R^*_4P^+MX_Z^-$, and $R^*_4N^+MX_Z^-$, wherein each $R^*$ is independently hydrocarbyl or substituted hydrocarbyl having from 1 to 30 carbon atoms; M is an element selected from transition metals, rare earth metals, lanthanide metals, metalloids, phosphorus, and sulfur; X is a halo (e.g. chloro, bromo, iodo), and z has a value such that the product (z times charge on X)+oxidation number of M=−1. Examples of substituents on the hydrocarbyl group include, but are not limited to, $C_1$ to $C_8$ alkoxy, $C_1$ to $C_{16}$ alkyl, nitro, chloro, bromo, cyano, carboxyl, mercapto, and heterocyclic aromatic groups, such as pyridyl, thiophenyl, and pyranyl. Examples of metals represented by M include, but are not limited to, transition metals, such as Fe, Ti, Zr, Sc, V, Cr, and Mn; lanthanide metals, such as Pr, and Nd; other metals, such as Cs, Sb, Sn, Bi, Al, Ga, and In; metalloids, such as B, and As; and P. The formula $MX_Z^-$ represents a non-basic, non-nucleophilic anion. Examples of anions having the formula $MX_Z^-$ include, but are not limited to, $BF_4^-$, $PF_6^-$, $AsF_6^-$, $SbF_6^-$, $SbCl_6^-$, and $SnCl_6^-$.

Examples of onium salts include, but are not limited to, bis-diaryliodonium salts, such as bis(dodecyl phenyl)iodonium hexafluoroarsenate, bis(dodecylphenyl)iodonium hexafluoroantimonate, and dialkylphenyliodonium hexafluoroantimonate.

Examples of diaryliodonium salts of sulfonic acids include, but are not limited to, diaryliodonium salts of perfluoroalkylsulfonic acids, such as diaryliodonium salts of perfluorobutanesulfonic acid, diaryliodonium salts of perfluoroethanesulfonic acid, diaryliodonium salts of perfluorooctanesulfonic acid, and diaryliodonium salts of trifluoromethanesulfonic acid; and diaryliodonium salts of aryl sulfonic acids, such as diaryliodonium salts of para-toluenesulfonic acid, diaryliodonium salts of dodecylbenzenesulfonic acid, diaryliodonium salts of benzenesulfonic acid, and diaryliodonium salts of 3-nitrobenzenesulfonic acid.

Examples of triarylsulfonium salts of sulfonic acids include, but are not limited to, triarylsulfonium salts of perfluoroalkylsulfonic acids, such as triarylsulfonium salts of perfluorobutanesulfonic acid, triarylsulfonium salts of perfluoroethanesulfonic acid, triarylsulfonium salts of perfluorooctanesulfonic acid, and triarylsulfonium salts of trifluoromethanesulfonic acid; and triarylsulfonium salts of aryl sulfonic acids, such as triarylsulfonium salts of para-toluenesulfonic acid, triarylsulfonium salts of dodecylbenzenesulfonic acid, triarylsulfonium salts of benzenesulfonic acid, and triarylsulfonium salts of 3-nitrobenzenesulfonic acid.

Examples of diaryliodonium salts of boronic acids include, but are not limited to, diaryliodonium salts of perhaloarylboronic acids. Examples of triarylsulfonium salts of boronic acids include, but are not limited to, triarylsulfonium salts of perhaloarylboronic acid. Diaryliodonium salts of boronic acids and triarylsulfonium salts of boronic acids are understood in the art, as exemplified in European Pat. App. No. EP 0562922.

The cationic photoinitiator can be a single cationic photoinitiator or a mixture comprising two or more different cationic photoinitiators, each as described above. The concentration of the cationic photoinitiator is typically from 0.01 to 20% (w/w), alternatively from 0.1 to 20% (w/w), alternatively from 0.1 to 5% (w/w), based on the weight of the organosiloxane of the composition.

When the organosiloxane contains acryoyloxyalkyl, substituted acryloyloxyalkyl, alkenyl groups, alkynyl groups, or thiol substituted organic groups, the composition can further comprise at least one free radical photoinitiator. The free radical photoinitiator can be any free radical photoinitiator capable of initiating cure (cross-linking) of the organosiloxane upon exposure to irradiation.

Examples of free radical photoinitiators include, but are not limited to, benzophenone; 4,4'-bis(dimethylamino)benzophenone; halogenated benzophenones; acetophenone; $\alpha$-hydroxyacetophenone; chloro acetophenones, such as dichloroacetophenones and trichloroacetophenones; dialkoxyacetophenones, such as 2,2-diethoxyacetophenone; $\alpha$-hydoxyalkylphenones, such as 2-hydroxy-2-methyl-1-phenyl-1-propanone and 1-hydroxycyclohexyl phenyl ketone; $\alpha$-aminoalkylphenones, such as 2-methyl-4'-(methylthio)-2-morpholiniopropiophenone; benzoin; benzoin ethers, such as benzoin methyl ether, benzoin ethyl ether, and benzoin isobutyl ether; benzil ketals, such as 2,2-dimethoxy-2-phenylacetophenone; acylphosphinoxides, such as diphenyl(2,4,6-trimethylbenzoyl)phosphine oxide; xanthone derivatives; thioxanthone derivatives; fluorenone derivatives; methyl phenyl glyoxylate; acetonaphthone; anthraquninone derivatives; sufonyl chlorides of aromatic compounds; and O-acyl $\alpha$-oximinoketones, such as 1-phenyl-1,2-propanedione-2-(O-ethoxycarbonyl)oxime.

The free radical photoinitiator may additionally or alternatively be a polysilane, such as the phenylmethylpolysilanes defined by West in U.S. Pat. No. 4,260,780, which is hereby incorporated by reference; the aminated methylpolysilanes defined by Baney et al. in U.S. Pat. No. 4,314,956, which is hereby incorporated by reference; the methylpolysilanes of Peterson et al. in U.S. Pat. No. 4,276,424, which is hereby incorporated by reference; and the polysilastyrene defined by West et al. in U.S. Pat. No. 4,324,901, which is hereby incorporated by reference.

The free radical photoinitiator can be a single free radical photoinitiator or a mixture comprising two or more different free radical photoinitiators. The concentration of the free radical photoinitiator is typically from 0.1 to 20% (w/w), alternatively from 1 to 10% (w/w), alternatively from 0.1 to 5% (w/w), based on the weight of the organosiloxane of the composition.

According to a second embodiment of the composition, the composition comprises A) an organosilicon compound having an average of at least two silicon-bonded ethylenically unsaturated groups per molecule. The composition further comprises B) an organosilicon compound having an average of at least two silicon-bonded hydrogen atoms per molecule in an amount sufficient to cure the composition. The composition yet further comprises C) a catalytic amount of a photoactivated hydrosilylation catalyst. Optionally, the composition can further comprise D) a filler. A reaction product of the composition comprises a reaction product of components A), B), and C). Optionally, the reaction product is formed in the presence of component D). The reaction product may also be formed in the presence of one or more ceramic powders as the filler. In specific embodiments, the composition of this second embodiment is utilized with a powder-bed (or binder jet) printer.

According to a third embodiment of the composition, the composition comprises A) an organosilicon compound having an average of at least two silicon-bonded ethylenically unsaturated groups per molecule. The composition further comprises B) an organosilicon compound having an average of at least two sulfur-bonded hydrogen atoms per molecule in an amount sufficient to cure the composition. The composition yet further comprises C) a catalytic amount of a photoactivated free radical initiator. Optionally, the composition can further comprise D) a filler. A reaction product of the composition comprises a reaction product of components A), B), and C). Optionally, the reaction product is formed in the presence of component D). The reaction product may also be formed in the presence of one or more ceramic powders as the filler. In specific embodiments, the composition of this third embodiment is utilized with SLA (or a stereolithography printer), alternatively a powder-bed (or binder jet) printer.

Further embodiments of the aforementioned components are described below. Various combinations of the components described above and below for the inventive compositions are contemplated.

Component A)

In various embodiments, component A) is selected from the group of polysiloxanes, polysilanes, polycarbosilanes, polycarbosiloxanes, or combinations thereof. Suitable ethylenically unsaturated groups are as described above. In specific embodiments, the silicon-bonded ethylenically unsaturated groups of component A) are vinyl groups or allyl groups, alternatively vinyl groups. The silicon-bonded ethylenically unsaturated groups of component A) are typically alkenyl groups.

In certain embodiments, ethylenically unsaturated moieties of the silicon-bonded ethylenically unsaturated groups are separated by at least 4 atoms, alternatively at least 5 atoms, alternatively at least 6 atoms, alternatively at least 7 atoms, alternatively at least 8 atoms, alternatively at least 9 atoms, alternatively by 10 or more atoms.

Surprisingly, it was discovered that spacing of the ethylenically unsaturated moieties of the silicon-bonded ethylenically unsaturated groups exhibits a significant improvement in cure rate compared to similar compositions having ethylenically unsaturated moieties of the silicon-bonded ethylenically unsaturated groups bonded to adjacent silicon atoms. It is thought that such spacing may prevent undesirable complexing with the photoactivated hydrosilylation catalyst, which hinders cure of the composition. Cure times of 30 seconds or less, 20 seconds or less, or 10 seconds or less, are possible and can be appreciated with reference to the Examples section.

Examples of atom separation are illustrated in the simplified polysiloxane i) and polysilane ii) structures below:

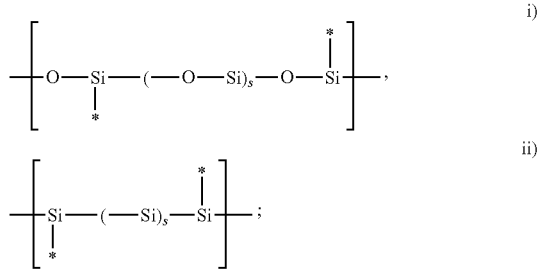

wherein each * is an independently selected silicon-bonded ethylenically unsaturated group and 0≤s.

If the silicon-bonded ethylenically unsaturated groups in polysiloxane i) are vinyl groups, s must be at least 1 to meet the condition of at least 4 atoms separating the ethylenically unsaturated moieties, e.g. —Si—O—Si—O—Si— (5 atom separation). If s were 0, the condition would not be met, e.g. —Si—O—Si— (3 atom separation). Alternatively, if the silicon-bonded ethylenically unsaturated groups in polysiloxane i) are allyl groups, the condition of at least 4 atoms separating the ethylenically unsaturated moieties can still be met even when s is 0, e.g. —C—Si—O—Si—C— (5 atom separation). In certain embodiments, the at least 4 atoms separating the ethylenically unsaturated moieties are selected from silicon atoms and oxygen atoms.

If the silicon-bonded ethylenically unsaturated groups in polysilane ii) are vinyl groups, s must be at least 2 to meet the condition of at least 4 atoms separating the ethylenically unsaturated moieties, e.g. —Si—Si—Si—Si— (4 atom separation). If s were 0 or 1, the condition would not be met, e.g. —Si—Si— (2 atom separation) or —Si—Si—Si (3 atom separation). Alternatively, if the silicon-bonded ethylenically unsaturated groups in polysilane ii) are allyl groups, the condition of at least 4 atoms separating the ethylenically unsaturated moieties can still be met even when s is 0, e.g. —C—Si—Si—C— (4 atom separation). While linear structures are shown above with i) and ii), it is to be appreciated that branching, e.g. via T and/or Q units, can also impart atom separation of the ethylenically unsaturated moieties.

As generally appreciated in the art, radiation curing of a conventional polymer composition depends on the penetration depth of the radiation. When fillers opaque to the radiation are present in the conventional composition, the depth of penetration is severely limited by the fillers, and deep cure is hindered. It was surprisingly found that filled hydrosilylation curable silicone compositions meeting the fast cure conditions as mentioned above, as well as mentioned below in A1), allow for instant cure as deep as at least 20 mm upon exposing the surface to radiation, such as UV.

The term "opaque" as used herein, generally means that less than about 60% of visible light is transmitted through the composition, or that less than about 55, 50, 45, 40, 35, 30, 25, 20, 15, 10, 5, 4, 3, 2, %, or about 1% or less of visible light is transmitted through the composition.

In certain embodiments, component A) is a polysiloxane of average formula A1):

$$(R^1R^2{}_2SiO_{1/2})_a(R^3{}_2SiO_{2/2})_b(R^4SiO_{3/2})_c(SiO_{4/2})_d \qquad A1),$$

wherein each of $R^1$, $R^2$, $R^3$, and $R^4$ is an independently selected substituted or unsubstituted hydrocarbyl group, 0≤a≤0.80, 0≤b≤1.00, 0≤c≤0.85, and 0≤d≤0.85, provided that a, b, c, and d are not simultaneously 0 and a+b+c+d=1. The numerical subscripts outside the parenthesis denote mole fractions. Also, in the preceding formula, the sequence of units in the particular polysiloxane is unspecified.

By "substituted," it is meant that one or more hydrogen atoms of the hydrocarbon may be replaced with atoms other than hydrogen (e.g. a halogen atom), or a carbon atom within the chain may be replaced with an atom other than carbon, i.e., it may include one or more heteroatoms within the chain, such as oxygen, sulfur, nitrogen, etc. Examples of suitable hydrocarbyl groups include alkyl, aryl, alkenyl, alkaryl, and aralkyl, groups. Suitable groups are as described and exemplified above for R in the first embodiment of the composition.

In various embodiments, $R^1$ is an alkenyl group, such as a vinyl group or allyl group, alternatively a vinyl group. In various embodiments, $R^2$ is an alkyl group, such as a methyl group. In various embodiments, $R^4$ is an aryl group, such as a phenyl group.

In certain embodiments, the organosilicon compound has at least one silicon-bonded phenyl group per molecule. Moreover, a silicon atom bearing an ethylenically unsaturated group and a silicon atom bearing a phenyl group are separated by only an oxygen atom. Surprisingly, it was found that curing rate can be improved if component A) includes a silicon atom with a phenyl group separated from another silicon atom with a vinyl group only by an oxygen atom. Typically, the phenyl group is part of a T unit. In certain embodiments, component A) comprises PhSi(OSiMe$_2$Vi)$_3$.

In certain embodiments, 0.10≤a≤0.80, alternatively 0.20≤a≤0.70, alternatively 0.25≤a≤0.50, alternatively 0.35≤a≤0.70. In specific embodiments, a=0.75 or 0.67. In certain embodiments, 0≤b≤1.00, alternatively 0≤b≤0.80, alternatively 0.25≤b≤0.75, alternatively 0.30≤b≤0.60. In specific embodiments, b=0 or 0.33. In certain embodiments, 0<c≤0.75, alternatively 0<c≤0.50, alternatively 0.25<c≤0.75, alternatively 0.25<c≤0.50. In specific embodiments, c=0.25 or 0. In certain embodiments, 0≤d≤0.50, alternatively 0≤d≤0.40, alternatively 0≤d≤0.30, alternatively 0≤d≤0.20. In a specific embodiment, d=0.

Component A) can be a single organosilicon compound or a mixture comprising two or more different organosilicon compounds, each as described above. Methods of preparing organosilicon compounds containing silicon-bonded ethylenically unsaturated atoms are understood in the art. For example, polysiloxanes of formula A1) can be prepared by ring-opening polymerization of a cyclic polysiloxane, e.g. D4, D6, etc. Other suitable methods are understood in the art.

Component A) can be of various viscosities. In certain embodiments, component A) has a viscosity less than 1,000,000 centistokes at 25° C., alternatively a viscosity of from 1 to 100,000 centistokes at 25° C., alternatively from 1 to 10,000 centistokes at 25° C., alternatively from 1 to 100 centistokes at 25° C.

Component B)

The organosilicon compound has an average of at least two silicon-bonded hydrogen atoms per molecule, alternatively at least three silicon-bonded hydrogen atoms per molecule. It is generally understood that cross-linking occurs when the sum of the average number of ethylenically unsaturated groups per molecule in component A) and the average number of silicon-bonded hydrogen atoms per molecule in component B) is greater than four. In various embodiments, component B) is selected from the group of organohydrogensiloxanes, organohydrogensilanes, or combinations thereof.

The organohydrogensilane can be a monosilane, disilane, trisilane, or polysilane. Similarly, the organohydrogensiloxane can be a disiloxane, trisiloxane, or polysiloxane. The structure of the organosilicon compound can be linear, branched, cyclic, or resinous. Cyclosilanes and cyclosiloxanes typically have from 3 to 12 silicon atoms, alternatively from 3 to 10 silicon atoms, alternatively from 3 to 4 silicon atoms. In acyclic polysilanes and polysiloxanes, the silicon-bonded hydrogen atoms can be located at terminal, pendant, or at both terminal and pendant positions.

Examples of organohydrogensilanes include, but are not limited to, diphenylsilane, 2-chloroethylsilane, bis[(p-dimethylsilyl)phenyl]ether, 1,4-dimethyldisilylethane, 1,3,5-tris(dimethylsilyl)benzene, 1,3,5-trimethyl-1,3,5-trisilane, poly(methylsilylene)phenylene, and poly(methylsilylene)methylene.

The organohydrogensilane can also have the formula $HR^1{}_2Si-R^3-SiR^1{}_2H$, wherein $R^1$ is $C_1$ to $C_{10}$ hydrocarbyl or $C_1$ to $C_{10}$ halogen-substituted hydrocarbyl, both free of aliphatic unsaturation, and $R^3$ is a hydrocarbylene group free of aliphatic unsaturation having a formula selected from:

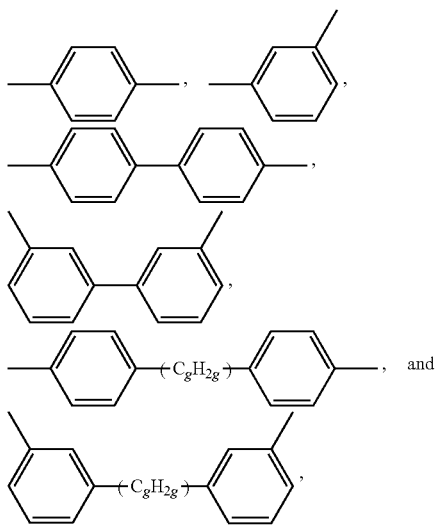

wherein g is from 1 to 6. The hydrocarbyl and halogen-substituted hydrocarbyl groups represented by $R^1$ are as described and exemplified above for R in the first embodiment of the composition.

Examples of organohydrogensilanes having the formula $HR^1{}_2Si-R^3-SiR^1{}_2H$, wherein $R^1$ and $R^3$ are as described and exemplified above include, but are not limited to, silanes having the following formulae:

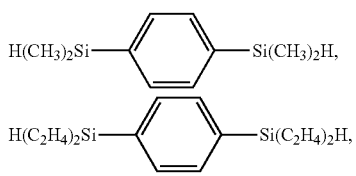

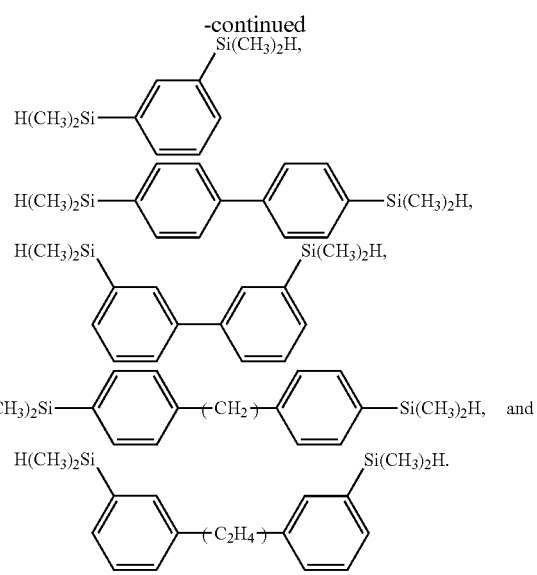

Examples of organohydrogensiloxanes include, but are not limited to, 1,1,3,3-tetramethyldisiloxane, 1,1,3,3-tetraphenyldisiloxane, phenyltris(dimethylsiloxy)silane, 1,3,5-trimethylcyclotrisiloxane, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), and a siloxane consisting essentially of $HMe_2SiO_{1/2}$ units, $Me_3SiO_{1/2}$ units, and $SiO_{4/2}$ units.

The organohydrogensiloxane can also be an organohydrogenpolysiloxane resin having the formula (II):

$$(R^1R^4{}_2SiO_{1/2})_w(R^4{}_2SiO_{2/2})_x(R^1SiO_{3/2})_y(SiO_{4/2})_z \quad (II),$$

wherein $R^1$ is $C_1$ to $C_{10}$ hydrocarbyl or $C_1$ to $C_{10}$ halogen-substituted hydrocarbyl, both free of aliphatic unsaturation, $R^4$ is $R^1$ or an organosilylalkyl group having at least one silicon-bonded hydrogen atom, w is from 0 to 0.8, x is from 0 to 0.6, y is from 0 to 0.99, z is from 0 to 0.35, w+x+y+z=1, y+z/(w+x+y+z) is from 0.2 to 0.99, and w+x/(w+x+y+z) is from 0.01 to 0.8, provided at least 50 mol % of the groups $R^4$ are organosilylalkyl.

The hydrocarbyl and halogen-substituted hydrocarbyl groups represented by $R^1$ are as described and exemplified above for R in the first embodiment of the composition. Examples of organosilylalkyl groups represented by $R^4$ include, but are not limited to, groups having the following formulae:

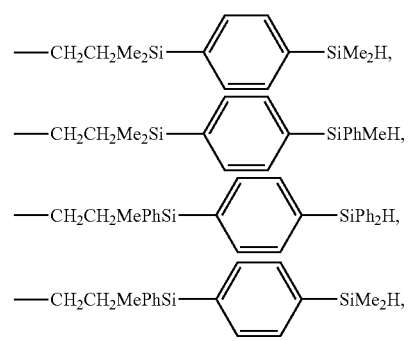

—CH$_2$CH$_2$SiMe$_2$H, —CH$_2$CH$_2$SiMe$_2$C$_n$H$_{2n}$SiMe$_2$H,
—CH$_2$CH$_2$SiMe$_2$C$_n$H$_{2n}$SiMePhH,

—CH$_2$CH$_2$SiMePhH, —CH$_2$CH$_2$SiPh$_2$H,
—CH$_2$CH$_2$SiMePhC$_n$H$_{2n}$SiPh$_2$H,

—CH$_2$CH$_2$SiMePhC$_n$H$_{2n}$SiMe$_2$H,
—CH$_2$CH$_2$SiMePhOSiMePhH, and

—CH$_2$CH$_2$SiMePhOSiPh(OSiMePhH)$_2$, where subscript n has a value of from 2 to 10.

In the formula (II) of the organohydrogenpolysiloxane resin, the subscripts w, x, y, and z are mole fractions. The subscript w typically has a value of from 0 to 0.8, alternatively from 0.02 to 0.75, alternatively from 0.05 to 0.3; the subscript x typically has a value of from 0 to 0.6, alternatively from 0 to 0.45, alternatively from 0 to 0.25; the subscript y typically has a value of from 0 to 0.99, alternatively from 0.25 to 0.8, alternatively from 0.5 to 0.8; the subscript z typically has a value of from 0 to 0.35, alternatively from 0 to 0.25, alternatively from 0 to 0.15. Also, the ratio y+z/(w+x+y+z) is typically from 0.2 to 0.99, alternatively from 0.5 to 0.95, alternatively from 0.65 to 0.9. Further, the ratio w+x/(w+x+y+z) is typically from 0.01 to 0.80, alternatively from 0.05 to 0.5, alternatively from 0.1 to 0.35.

Typically, at least 20 mol %, alternatively at least 35 mol %, alternatively at least 50 mol % of the groups R$^4$ in the organohydrogenpolysiloxane resin are organosilylalkyl groups having at least one silicon-bonded hydrogen atom.

The organohydrogenpolysiloxane resin typically has a number-average molecular weight (Mn) of from 500 to 50,000, alternatively from 500 to 10,000, alternatively 1,000 to 3,000, where the molecular weight is determined by gel permeation chromatography employing a low angle laser light scattering detector, or a refractive index detector and silicone resin (MQ) standards.

The organohydrogenpolysiloxane resin typically contains less than 10% (w/w), alternatively less than 5% (w/w), alternatively less than 2% (w/w), of silicon-bonded hydroxy groups, as determined by 29Si NMR.

The organohydrogenpolysiloxane resin contains R$^1$SiO$_{3/2}$ units (i.e., T units) and/or SiO$_{4/2}$ units (i.e., Q units) in combination with R$^1$R$^4{}_2$SiO$_{1/2}$ units (i.e., M units) and/or R$^4{}_2$SiO$_{2/2}$ units (i.e., D units), where R$^1$ and R$^4$ are as described and exemplified above. For example, the organohydrogenpolysiloxane resin can be a DT resin, an MT resin, an MDT resin, a DTQ resin, and MTQ resin, and MDTQ resin, a DQ resin, an MQ resin, a DTQ resin, an MTQ resin, or an MDQ resin.

Examples of organohydrogenpolysiloxane resins include, but are not limited to, resins having the following formulae:

((HMe$_2$SiC$_6$H$_4$SiMe$_2$CH$_2$CH$_2$)$_2$MeSiO$_{1/2}$)$_{0.12}$(Ph-SiO$_{3/2}$)$_{0.88}$, ((HMe$_2$SiC$_6$H$_4$SiMe$_2$CH$_2$CH$_2$)$_2$MeSiO$_{1/2}$)$^{0.17}$(Ph-SiO$_{3/2}$)$_{0.83}$, ((HMe$_2$SiC$_6$H$_4$SiMe$_2$CH$_2$CH$_2$)$_2$MeSiO$_{1/2}$)$_{0.17}$(Me-SiO$_{3/2}$)$_{0.17}$(PhSiO$_{3/2}$)$_{0.66}$, ((HMe$_2$SiC$_6$H$_4$SiMe$_2$CH$_2$CH$_2$)$_2$MeSiO$_{1/2}$)$_{0.15}$(Ph-SiO$_{3/2}$)$_{0.75}$(SiO$_{4/2}$)$_{0.10}$, and ((HMe$_2$SiC$_6$H$_4$SiMe$_2$CH$_2$CH$_2$)$_2$MeSiO$_{1/2}$)$_{0.08}$
((HMe$_2$SiC$_6$H$_4$SiMe$_2$CH$_2$CH$_2$)—

(Me$_2$SiO$_{1/2}$)$_{0.06}$(PhSiO$_{3/2}$)$_{0.86}$, where C$_6$H$_4$ denotes a para-phenylene group, and the numerical subscripts outside the parenthesis denote mole fractions. Also, in the preceding formulae, the sequence of units is unspecified.

Component B) can be a single organosilicon compound or a mixture comprising two or more different organosilicon compounds, each as described above. For example, component B) can be a single organohydrogensilane, a mixture of two different organohydrogensilanes, a single organohydrogensiloxane, a mixture of two different organohydrogensiloxanes, or a mixture of an organohydrogensilane and an organohydrogensiloxane. In particular, component B) can be a mixture comprising at least 0.5% (w/w), alternatively at least 25% (w/w), alternatively at least 50% (w/w), based on the total weight of component B), of the organohydrogenpolysiloxane resin having the formula (II), and an organohydrogensilane and/or organohydrogensiloxane, the latter different from the organohydrogenpolysiloxane resin.

The concentration of component B) is sufficient to cure (cross-link) component A). The exact amount of component B) depends on the desired extent of cure, which generally increases as the ratio of the number of moles of silicon-bonded hydrogen atoms in component B) to the number of moles of ethylenically unsaturated groups in component A) increases. The concentration of component B) is typically sufficient to provide from 0.4 to 2 moles of silicon-bonded hydrogen atoms, alternatively from 0.8 to 1.5 moles of silicon-bonded hydrogen atoms, alternatively from 0.9 to 1.1 moles of silicon-bonded hydrogen atoms, per mole of ethylenically unsaturated groups in component A).

Methods of preparing organosilicon compounds containing silicon-bonded hydrogen atoms are understood in the art. For example, organohydrogensilanes can be prepared by reaction of Grignard reagents with alkyl or aryl halides. In particular, organohydrogensilanes having the formula HR$^1{}_2$Si—R$^3$—SiR$^1{}_2$H can be prepared by treating an aryl dihalide having the formula R$^3$X$_2$ with magnesium in ether to produce the corresponding Grignard reagent and then treating the Grignard reagent with a chlorosilane having the formula HR$^1{}_2$SiCl, where R$^1$ and R$^3$ are as described and exemplified above. Methods of preparing organohydrogensiloxanes, such as the hydrolysis and condensation of organohalosilanes, are also understood in the art.

In other embodiments, component B) is a mercapto-functional polyorganosiloxane (rather than a SiH-functional polyorganosiloxane). A combination of SH-functional and SiH-functional polyorganosiloxanes may also be used. A thiol is an organosulfur compound that contains a carbon-bonded sulfhydryl (—C—SH or R—SH) group (where R generally represents an alkane, alkene, or other carbon-containing group of atoms).

In various embodiments, suitable mercapto-functional compounds have structures similar to those as described above with respect to the SiH-functional compounds; however, the organosilicon compounds in these embodiments have an average of at least two sulfur-bonded hydrogen atoms per molecule, alternatively at least three sulfur-bonded hydrogen atoms per molecule. For example, two or more SiH groups can be substituted for two or more SH groups, while maintaining the remainder of the respective compound.

In certain embodiments, the mercapto-functional polyorganosiloxane can have the average unit formula: [(CH$_3$)$_3$SiO$_{1/2}$]$_x$[(CH$_3$)$_2$SiO]$_y$[R(CH$_3$)SiO]$_z$, wherein R is independently a mercapto(C$_{1-30}$)hydrocarbyl group. The subscripts x, r, and z can have any suitable values, such that the composition has the properties described herein. For example, x can be about 0.02 to about 0.05, or about 0.025 to about 0.04, or about 0.02 or less, or about 0.022, 0.024, 0.026, 0.028, 0.030, 0.032, 0.034, 0.036, 0.038, 0.040, 0.042, 0.044, 0.046, 0.048, or about 0.05 or more. For example, y can be about 0 to about 0.9, or about 0.4 to about 0.8, or about 0, 0.05, 0.1, 0.15, 0.2, 0.25, 0.3, 0.35, 0.4, 0.45, 0.5, 0.55, 0.6, 0.65, 0,7, 0.75, 0.8, 0.85, or about 0.9 or more. For example, z can be about 0.08 to about 0.98, or about 0.2 to about 0.4, or about 0.08 or less, or about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, or about 0.98 or more.

In some embodiments, the mercapto-functional polyorganosiloxane has the unit formula:

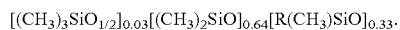

R can be any suitable mercapto($C_{1-30}$)hydrocarbyl group. In some embodiments, at each occurrence R is independently a mercapto($C_{1-30}$)alkyl group. At each occurrence R can be independently a mercapto($C_{1-10}$)alkyl group. In some embodiments, R can be mercapto propyl, HS—$(CH_2)_3$—.

Additional examples of suitable mercapto-functional polyorganosiloxane, for use as, or along with component B) as described herein, are disclosed in International Publication No. WO 2015069454 A1 to Clapp et al., the disclosure of which is incorporated by reference.

Component B) can be of various viscosities. In certain embodiments, component B) has a viscosity less than 1,000,000 centistokes at 25° C., alternatively a viscosity of from 1 to 100,000 centistokes at 25° C., alternatively from 1 to 10,000 centistokes at 25° C., alternatively from 1 to 100 centistokes at 25° C.

Component C)

In certain embodiments, component C) is a photoactivated hydrosilylation catalyst (e.g. for hydrosilylation reaction). The photoactivated hydrosilylation catalyst can be any hydrosilylation catalyst capable of catalyzing the hydrosilylation of component A) with component B) upon exposure to irradiation. The photoactivated hydrosilylation catalyst can be any of the well-known hydrosilylation catalysts comprising a platinum group metal or a compound containing a platinum group metal. The platinum group metals include platinum, rhodium, ruthenium, palladium, osmium and iridium. Typically, the platinum group metal is platinum, based on its high activity in hydrosilylation reactions. The suitability of particular photoactivated hydrosilylation catalyst for use in the composition can be readily determined by routine experimentation using the methods in the Examples section below.

Examples of photoactivated hydrosilylation catalysts include, but are not limited to, platinum(II) β-diketonate complexes such as platinum(II) bis(2,4-pentanedioate), platinum(II) bis(2,4-hexanedioate), platinum(II) bis(2,4-heptanedioate), platinum(II) bis(1-phenyl-1,3-butanedioate, platinum(II) bis(1,3-diphenyl-1,3-propanedioate), platinum (II) bis(1,1,1,5,5,5-hexafluoro-2,4-pentanedioate); (η-cyclopentadienyl)trialkylplatinum complexes, such as (Cp)trimethylplatinum, (Me-Cp)trimethylplatinum, (Cp)ethyldimethylplatinum, (Cp)triethylplatinum, (chloro-Cp)trimethylplatinum, and (trimethylsilyl-Cp)trimethylplatinum, where Cp represents cyclopentadienyl; triazene oxide-transition metal complexes, such as Pt[$C_6H_5$NNNOCH$_3$]$_4$, Pt[p-CN—$C_6H_4$NNNOC$_6H_{11}$]$_4$, Pt[p-H$_3$COC$_6H_4$NNNOC$_6H_{11}$]$_4$, Pt[p-CH$_3$(CH$_2$)$_x$—$C_6H_4$NNNOCH$_3$]$_4$, 1,5-cyclooctadiene. Pt[p-CN—$C_6H_4$NNNOC$_6H_{11}$]$_2$, 1,5-cyclooctadiene. Pt[p-CH$_3$O—$C_6H_4$NNNOCH$_3$]$_2$, [($C_6H_5$)$_3$P]$_3$Rh[p-CN—$C_6H_4$NNNOC$_6H_{11}$], and Pd[p-CH$_3$(CH$_2$)$_x$—$C_6H_4$NNNOCH$_3$]$_2$, where x is 1, 3, 5, 11, or 17; (η-diolefin)(σ-aryl)platinum complexes, such as (η4-1,5-cyclooctadienyl)diphenylplatinum, η4-1,3,5,7-cyclooctatetraenyl)diphenylplatinum, (η4-2,5-norboradienyl)diphenylplatinum, (η4-1,5-cyclooctadienyl)bis-(4-dimethylaminophenyl)platinum, (η4-1,5-cyclooctadienyl)bis-(4-acetylphenyl)platinum, and (η4-1,5-cyclooctadienyl)bis-(4-trifluormethylphenyl)platinum. In certain embodiments, the photoactivated hydrosilylation catalyst is a Pt(II) β-diketonate complex and in further embodiments the photoactivated hydrosilylation catalyst is platinum(II) bis(2,4-pentanedioate).

Component C) can be a single photoactivated hydrosilylation catalyst or a mixture comprising two or more different photoactivated hydrosilylation catalysts.

The concentration of component C) is sufficient to catalyze the addition reaction of component A) with B) upon exposure to radiation as described in the method above. The concentration of component C) is sufficient to provide typically from 0.1 to 1000 ppm of platinum group metal, alternatively from 0.5 to 200 ppm of platinum group metal, alternatively from 0.5 to 100 ppm of platinum group metal, alternatively from 1 to 25 ppm of platinum group metal, alternatively from 1 to 20 ppm of platinum group metal, based on the combined weight of components A) and B).

Methods of preparing photoactivated hydrosilylation catalysts are understood in the art. For example, methods of preparing platinum(II) β-diketonates are reported by Guo et al. (Chemistry of Materials, 1998, 10, 531-536). Methods of preparing (η-cyclopentadienyl)-trialkylplatinum complexes are disclosed in U.S. Pat. No. 4,510,094. Methods of preparing triazene oxide-transition metal complexes are disclosed in U.S. Pat. No. 5,496,961. Methods of preparing (η-diolefin)(σ-aryl)platinum complexes are taught in U.S. Pat. No. 4,530,879.

In other embodiments, component C) is a photoactivated free radical initiator (e.g. for thiol-ene reaction). Suitable initiators and amounts thereof are as described above.

Component D)

The composition may further optionally comprise D) the filler. The filler may be, for example, an organic filler, an inorganic filler, a ceramic powder, or combinations thereof. The organic filler may be a polymer, such as, but not limited to, polystyrene, polyethylene, polypropylene, polysulfone, polyamide, polyimide, polyetheretherketone, etc. The organic filler can also be a smaller molecule either amorphous or crystalline in nature, and can be of in various shapes and sizes. The inorganic filler or ceramic powder can be any inorganic compounds that are compatible with the curing chemistry. Examples include, but are not limited to, silicon dioxide, titanium dioxide, zirconium dioxide, barium titanate, strontium titanate, etc. A mixture of more than one inorganic or organic with inorganic fillers are also suitable.

In embodiments including the filler, the filler can be present as any suitable wt. % of the composition, such as about 0.01 wt. % to about 90 wt. %, about 1 wt. % to about 80 wt. %, about 5 wt. % to about 80 wt. %, about 10 wt. % to about 80 wt. %, about 15 wt. % to about 80 wt. %, about 25 wt. % to about 80 wt. %, about 30 wt. % to about 80 wt. %, about 40 wt. % to about 80 wt. %, about 50 wt. % to about 75 wt. %, about 55 wt. % to about 75 wt. %, about 60 wt. % to about 70 wt. %, alternatively about 0.1 wt. %, 1, 2, 3, 4, 5, 6, 7, 8, 9, 10, 11, 12, 13, 14, 15, 16, 18, 20, 25, 30, 35, 40, 45, 50, 55, 60, 65, or about 70 wt. % or more. It is to be appreciated that in certain embodiments, the filler can be utilized in an amount equal to or greater than 100 parts by weight of components A), B), and C) combined. For example, the filler can be present in an amount greater than about 100, greater than about 200, greater than about 300, or greater than about 400, parts by weight based on 100 parts by weight of components A), B), and C) combined. It was surprisingly found that high loading of filler was possible with the inventive composition relative to conventional compositions.

The filler can have any suitable particle size, e.g., the longest dimension of the particle, such as the average longest dimension. For example, the filler can have a primary particle size of about 5 to about 100, about 10 to about 90, about 20 to about 80, about 30 to about 70, about 40 to about 60, or about 50, microns, alternatively 5 microns or less, alternatively 100 microns or more. As used herein, "primary" particle size refers to the actual particles in their un-conglomerated state, which can optionally conglomerate to form larger "secondary" particles.

Any of the compositions may optionally and independently further comprise additional ingredients or components ("additives"), especially if the ingredient or component does not prevent the organosiloxane of the composition from curing. Examples of additional ingredients include, but are not limited to, adhesion promoters; dyes; pigments; anti-oxidants; carrier vehicles; heat stabilizers; flame retardants; thixotropic agents; flow control additives; inhibitors; fillers (different from component D)), including extending and reinforcing fillers; and cross-linking agents. In various embodiments, the composition further comprises ceramic powder. The amount of ceramic powder can vary and may depend on the 3D printing process being utilized.

One or more of the additives can be present as any suitable wt. % of the composition, such as about 0.1 wt. % to about 15 wt. %, about 0.5 wt. % to about 5 wt. %, or about 0.1 wt. % or less, about 1 wt. %, 2, 3, 4, 5, 6, 7, 8, 9, 10, 11, 12, 13, 14, or about 15 wt. % or more of the composition.

In certain embodiments, the composition is free of acrylate or epoxy functionality. In these embodiments, each of components A) and B) lacks an acrylate functional group or an epoxy functional group as a radiation-sensitive group. Moreover, there are generally no other components having such functional groups present in the composition. These embodiments are typical with at least the second embodiment of the composition, where the radiation-sensitive groups are generally ethylenically unsaturated groups, more generally alkenyl groups.

The composition including at least components A), B), and C) can be of various viscosities. In certain embodiments, the composition has a viscosity less than 500, less than 250, or less than 100, centistokes at 25° C., alternatively a viscosity of from 1 to 1,000,000 centistokes at 25° C., alternatively from 1 to 100,000 centistokes at 25° C., alternatively from 1 to 10,000 centistokes at 25° C. Viscosity of the composition can be changed by altering the amounts and/or molecular weight of one or more components. Specifically, viscosity may be adjusted to match components of the 3D printer, particularly any nozzle or dispensing mechanism, to control heat or speed or other parameters associated with 3D printing. As readily understood in the art, kinematic viscosity may be measured in accordance with ASTM D-445 (2011), entitled "Standard Test Method for Kinematic Viscosity of Transparent and Opaque Liquids (and Calculation of Dynamic Viscosity)."

Multi-Part Composition

The composition can be a one-part composition comprising components A), B), and C) in a single part or, alternatively, a multi-part composition comprising these components in two or more parts, provided components A), B), and C) are not present in the same part. For example, a multi-part composition can comprise a first part containing a portion of component A) and all of component C), and a second part containing the remaining portion of component A) and all of component B). In certain embodiments, component A) is in a first part, component B) is in a second part separate from the first part, and component C) is in the first part, in the second part, and/or in a third part separate from the first and second parts. If utilized, component D) may be present in a respective part (or parts) along with at least one of components A), B), or C), and/or can be in a separate part (or parts). Moreover, it is to be appreciated that the filler may already be present for certain printers and need not be part of the composition itself. For example, the filler may be in the bed of a powder-bed printer.

The one-part composition is typically prepared by combining the principal components and any optional ingredients in the stated proportions at ambient temperature, with or without the aid of a solvent. In various embodiments, the composition is free of solvent. Although the order of addition of the various components is not critical if the composition is to be used immediately, the hydrosilylation catalyst is typically added last at a temperature below about 30° C. to prevent premature curing of the composition. Also, the multi-part composition can be prepared by combining the components in each part.

Mixing can be accomplished by any of the techniques understood in the art such as milling, blending, and stirring, either in a batch or continuous process. The particular device is determined by the viscosity of the components and the viscosity of the final composition.

In certain embodiments, when the photocurable silicone compositions are multi-part photocurable silicone compositions, the separate parts of the multi-part photocurable silicone composition may be mixed in a dispense printing nozzle, e.g. a dual dispense printing nozzle, prior to and/or during printing. Alternatively, the separate parts may be combined immediately prior to printing. Alternatively still, the separate parts may be combined after exiting the dispense printing nozzle, e.g. by crossing printing streams or by mixing the separate parts as the layers are formed.

Curing Conditions

The composition can be cured by exposing the composition to irradiation, e.g. to radiation having a wavelength of from 150 to 800 nm, alternatively from 200 to 400 nm, at a dosage sufficient to cure (cross-link) the composition. The light source is typically a medium pressure mercury-arc lamp. The dose of radiation is typically from 10 to 20,000 mJ/cm2, alternatively from 100 to 2,000 mJ/cm2. Moreover, the composition can be externally heated during or after exposure to radiation to enhance the rate and/or extent of cure.

3D Article

A 3D article can be formed according to the method. Specifically, the 3D article can be formed by printing the first and second photocurable silicone composition as described above with the method. The 3D article comprises the reaction product of the composition, i.e., the reaction product of components A), B), and C). In various embodiments, the reaction product is formed in the presence of component D). In certain embodiments, the 3D article comprises ceramic powder dispersed in the reaction product of the composition. The 3D article can be of various sizes and shapes. This disclosure is not limited to a particular type of 3D article.

INDUSTRIAL APPLICABILITY AND ADVANTAGES

Without limiting this disclosure, the composition of this disclosure meets strict requirements for 3D printing, especially for printing highly filled materials. Some of these requirements depend on the type of 3D printing process, but can include low viscosity; low surface tension; rapid cure, e.g., within 10 seconds after exposure to UV light; being free of solvent; dark cure capability that enables deep section cure not only with unfilled but also highly filled materials; very high char yield and good char mechanical integrity; and good green and fired part strength.

In various embodiments, the composition of this disclosure enables low shrinkage processing of ceramics utilizing a 3D printing process, e.g. binder jetting. One advantage provided by the composition is lower dimensional change during printing as well as downstream processing; however, other advantages are also possible including: shorter drying/curing time; faster solidification, and therefore diminished or eliminated feature "smearing"; higher surface quality; and better mechanical properties at relatively low firing temperatures.

The composition of this disclosure can be combined with ceramic powders and cured by exposure to UV light, even though the ceramic powder is opaque and, therefore, not transparent to UV light. It is thought that heat generated by the rapid and exothermic UV-initiated hydrosilylation cure of the composition sustains the cure throughout the material, even in regions impenetrable to UV light. As a result, the composition of this disclosure is especially suited for fabrication of filled or ceramic parts by 3D printing. Such parts generally need to resist firing temperature without distortion, and may need to be etched, e.g. via chemical etching. The composition provides these properties, while also having excellent purity.

The composition of this disclosure offers formulation flexibility to achieve desired end properties of the 3D article, 3D printing performance, etc. This may be achieved, for example, by choosing: a suitable combination of the types of SiH, SH, and Si-ethylenically unsaturated groups (e.g. Si-alkenyl groups), the molecular backbone as well as the molecular weights of components A) and B), suitable catalyst and concentration of component C), cross-link density and distribution of the cross-link density, and/or the heat release from hydrosilylation reaction per unit mass of the composition.

EXAMPLES

The following examples, illustrating compositions and their reaction products, are intended to illustrate and not to limit the invention.

The compositions are prepared using conventional lab techniques and are photoactivated with UV light. Components A through Q, used to prepare the various compositions, are illustrated in Table 1 below.

TABLE 1

| Component | Description |
|---|---|
| A | Silicone resin of average formula: $(ViMe_2SiO)_{35}(ViSiO_{3/2})_{65}$ |
| B | Tetramethyl tetravinyl cyclotetrasiloxane: $(ViMeSiO)_4$ |
| C | Silicone resin of average formula: $(ViMe_2SiO)_{35}(PhSiO_{3/2})_{65}$ |
| D | Vinyl terminated polydimethylsiloxane (PDMS): $ViMe_2SiO(Me_2SiO)_{4.5}SiMe_2Vi$ |
| E | 1,5 divinylhexamethyltrisiloxane: $ViMe_2SiOMe_2SiOSiMe_2Vi$ |
| F | Silicone resin of average formula: $(ViMe_2SiO)_{12.5}(Ph_2SiO)_{11.5}(PhSiO_{3/2})_{76}$ |
| G | Polymethylhydrogensiloxane: $Me_3SiO(HMeSiO)_{65}SiMe_3$ |
| H | Phenyltris(dimethylsiloxy)silane: $PhSi(OSiMe_2H)_3$ |
| I | Solution of 0.202 grams $Pt(AcAc)_2$ in 11.4 grams toluene |
| J | Vinyl terminated PDMS: $ViMe_2SiO(Me_2SiO)_{10.8}SiMe_2Vi$ |
| K | $Me_3SiO(Me_2SiO)_{87.6}((HSCH_2CH_2CH_2)MeSiO)_{13.9}SiMe_3$ |
| L | Photoinitiator 1 |
| M | $Me_3SiO((HSCH_2CH_2CH_2)MeSiO)_nSiMe_3$ |
| N | Photoinitiator 2 |
| O | $ViMe_2SiO(Me_2SiO)_{4.5}SiMe_2Vi$ |
| P | Solution of 0.0409 grams methylpentadienyl trimethyl platinum in 4.959 grams toluene |
| Q | Silica particle |

In Table 1 above, "Vi" stands for a vinyl group, "Me" stands for a methyl group, and "Ph" stands for a phenyl group. Components A through F, J and O each comprise A) an organosilicon compound having an average of at least two silicon-bonded ethylenically unsaturated groups, specifically alkenyl groups, per molecule. Components G and H each comprise B) an organosilicon compound having an average of at least two silicon-bonded hydrogen atoms per molecule. Component I comprises C) a photoactivated hydrosilylation catalyst, specifically platinum(II) acetylacetonate. Components K and M each comprise B) an organosilicon compound having an average of at least two sulfur-bonded hydrogen atoms per molecule. Component L is DAROCURE® 1173, which comprises 2-Hydroxy-2-methyl-1-phenyl-propan-1-one. The subscript n imparts component M with a viscosity of ~100 cSt. Component N is a 10 wt. % solution of IRGACURE® 819, which comprises Bis(2,4,6-trimethylbenzoyl)-phenylphosphineoxide, in toluene. Component Q has an average diameter of 50 microns.

After the compositions are prepared by mixing the various components, curing time is determined for each composition as follows. A Dymax UV curing chamber is used with a UV bulb part number of 38560, emitting light from 380 nm to visible in wavelength, and measuring 350 mJ/cm$^2$ in intensity at the surface on which a sample of composition is to be placed. 2 grams of liquid sample is placed in an aluminum or PE dish having a 5 cm diameter. Each sample is exposed to UV for 2 seconds at a time to determine the exposure time needed for the liquid to solidify. The solidification time is taken as the curing time. 23 different examples are prepared and tested as follows.

Example 1

4 grams (g) of H and 3.083 g of A are mixed, followed by mixing 0.016 g of I to arrive at a formulation with 20 ppm of Pt. The sample remains liquid after 10 minutes of exposure to UV light, i.e., it does not cure.

Example 2

4 g of H and 3.127 g of B are mixed, followed by mixing 0.016 g of I to arrive at a formulation with 20 ppm of Pt. The sample remains a liquid after 10 minutes of exposure to UV light, i.e., it does not cure.

Example 3

2 g of H and 1.564 g of B are mixed, followed by mixing 0.076 g of I to arrive at a formulation with 200 ppm of Pt. Curing time is 290 seconds.

Example 4

1 g of H and 3.2 g of F are mixed, followed by mixing 0.129 g of I to arrive at a formulation with 200 ppm of Pt. Curing time is 7 seconds.

Example 5

0.5 g of H and 2.32 g of D are mixed, followed by mixing 0.032 g of I to arrive at a formulation with 100 ppm of Pt. Curing time is 10 seconds.

Example 6

0.8 g of H and 2.83 g of D are mixed, followed by mixing 0.099 g of I to arrive at a formulation with 200 ppm of Pt. Curing time is 10 seconds.

Example 7

3.2 g of H and 3.44 g of E are mixed, followed by mixing 0.151 g of I to arrive at a formulation with 200 ppm of Pt. Curing time is 5 seconds.

Example 8

4 g of G and 5.504 g of B are mixed, followed by mixing 0.22 g of I to arrive at a formulation with 200 ppm of Pt. Curing time is 120 seconds.

Example 9

4 g of G and 5.504 g of B are mixed, followed by mixing 0.22 g of I to arrive at a formulation with 200 ppm of Pt. Curing time is 120 seconds.

Example 10

1 g of G and 2.07 g of D are mixed, followed by mixing 0.007 g of I to arrive at a formulation with 20 ppm of Pt. Curing time is 87 seconds.

Example 11

1 g of G and 2.07 g of D are mixed, followed by mixing 0.07 g of I to arrive at a formulation with 200 ppm of Pt. Curing time is 37 seconds.

Example 12

0.4 g of G and 2.25 g of D are mixed, followed by mixing 0.084 g of I to arrive at a formulation with 200 ppm of Pt. Curing time is 10 seconds.

Example 13

3.2 g of G and 3.3 g of E are mixed, followed by mixing 0.149 g of I to arrive at a formulation with 200 ppm of Pt. Curing time is 4 seconds.

Example 14

2.3 g of G and 4.35 g of E are mixed, followed by mixing 0.152 g of I to arrive at a formulation with 200 ppm of Pt. Curing time is 6 seconds.

Example 15

2.3 g of G and 4.35 g of E are mixed, followed by mixing 0.152 g of I to arrive at a formulation with 200 ppm of Pt. Curing time is 6 seconds.

Example 16

1.6 g of G and 3.03 g of E are mixed, followed by mixing 0.028 g of P to arrive at a formulation with 30 ppm of Pt. Curing time is 8 seconds.

Example 17

16 g of G and 30.3 g of E are mixed, followed by mixing 0.093 g of P to arrive at a formulation with 10 ppm of Pt. Curing time is 9 seconds.

Example 18

3 g of uncured mixture from Example 17 is mixed with 7 g of Q and cast into a rectangular mold made with Teflon bars. The size (or dimensions) of the mold is such that the cast has a depth of approximately 2 cm. The cast in the mold is exposed to the same UV source for 9 seconds, and the cast is left on a lab bench top for 10 seconds, then released from the mold to check the state of cure on the top as well as on the bottom. The resulting cast bar is well solidified throughout the entire thickness.

Example 19

Uncured mixture of Example 15 is mixed with 15.9 g of Q. The mixture is cast similarly (as in Example 18 above) into a Teflon mold to form a cast approximately 2 cm deep. The cast in the mold is exposed to the same UV source for 9 seconds, and the cast is left on a lab bench top for 10 seconds, then released from the mold to check the state of cure on the top as well as on the bottom. The resulting cast bar is well solidified throughout the entire thickness.

Example 20

2.0 g of J and 2.5 g of K are mixed, followed by mixing in 0.045 g of L to arrive at a formulation containing 1 wt. % photoinitiator L. Curing time is less than 1 second.

Example 21

3.0 g of K and 0.64 g of E are mixed, followed by mixing in 0.036 g of N to arrive at a formulation containing 0.1 wt. % photoinitiator N. Curing time is 10 seconds under a Belle DR-618 LED Nail Lamp with a 410 nm LED array.

Example 22

2.0 g of K, 0.36 g of M, and 0.773 g of E are mixed, followed by mixing in 0.031 g of N to arrive at a formulation containing 0.1 wt. % photoinitiator N. Curing time is 15 seconds under a Belle DR-618 LED Nail Lamp with a 410 nm LED array Example 23

10.0 g of K and 2.12 g of E are mixed, followed by mixing in 0.606 g of N to arrive at a formulation containing 0.5 wt. % photoinitiator N. Curing time is less than 1 second under a Belle DR-618 LED Nail Lamp with a 410 nm LED array.

Due to lack of cure or very long UV exposure time needed to cure, Examples 1, 2, 3, 8, and 9 are generally deemed to be comparative examples. Examples 4 through 7, and 10 through 23 are generally deemed to be invention examples.

The invention examples can be used in a variety of 3D printing processes to form 3D articles. Suitable 3D printing processes are described in the Detailed Description section above, including binder jetting and material extrusion. Examples having curing times of 10 seconds or less are deemed to be especially suitable for 3D printing with UV cure.

The following additional embodiments are provided, the numbering of which is not to be construed as designating levels of importance:

Embodiment 1 relates to the method wherein: i) the 3D printer is a powder-bed and inkjet 3D printer and the energy source emits at least UV radiation; ii) the 3D article comprises ceramic powder dispersed in the reaction product of the photocurable silicone composition; or iii) both i) and ii).

Embodiment 2 relates to the method wherein: i) the 3D printer is an extrusion 3D printer and the energy source emits at least UV radiation; ii) the photocurable silicone composition further comprises ceramic powder and is in the form of a slurry; or iii) both i) and ii).

Embodiment 3 relates to the method of Embodiment 1 or 2, wherein condition iii) is true and further comprising the step(s) of: i) heating and/or further irradiating a composite comprising the at least partially cured layers; ii) firing a composite comprising ceramic powder dispersed in the reaction product of the photocurable silicone composition; or iii) both i) and ii).

Embodiment 4 relates to a 3D article formed by printing the inventive photocurable silicone composition. The 3D article comprises the reaction product of: A) an organosilicon compound having an average of at least two silicon-bonded ethylenically unsaturated groups per molecule, wherein ethylenically unsaturated moieties of the silicon-bonded ethylenically unsaturated groups are separated by at least four atoms; B) an organosilicon compound having an average of at least two silicon-bonded hydrogen atoms per molecule in an amount sufficient to cure the photocurable silicone composition; and C) a catalytic amount of a photoactivated hydrosilylation catalyst.

The inventive method, steps thereof, inventive composition, and components thereof, are generally as described above. All combinations of the aforementioned embodiments are hereby expressly contemplated.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

The invention claimed is:

1. A method of forming a three-dimensional (3D) article, said method comprising the steps of:
   I) printing a first photocurable silicone composition with a 3D printer to form a layer;
   II) irradiating the layer with an energy source to form an at least partially cured layer;
   III) printing a second photocurable silicone composition on the at least partially cured layer with the 3D printer to form a subsequent layer; and
   IV) irradiating the subsequent layer with the energy source to form an at least partially cured subsequent layer; and
   V) optionally, repeating steps III) and IV) with independently selected photocurable silicone compositions for any additional layer(s) to form the 3D article;
   wherein the first and second photocurable silicone compositions are the same as or different from one another;

wherein the photocurable silicone composition(s) is(are) free of acrylate or epoxy functionality; and
wherein at least one of the photocurable silicone compositions comprises:
   A) an organosilicon compound having an average of at least two silicon-bonded ethylenically unsaturated groups per molecule, wherein:
      i) ethylenically unsaturated moieties of the silicon-bonded ethylenically unsaturated groups are separated by at least four atoms, and/or
      ii) component A) also has at least one silicon-bonded phenyl group per molecule and a silicon atom bearing an ethylenically unsaturated group and a silicon atom bearing a phenyl group are separated by only an oxygen atom;
   B) an organosilicon compound having an average of at least two silicon-bonded hydrogen atoms per molecule in an amount sufficient to cure the photocurable silicone composition; and
   C) a catalytic amount of a photoactivated hydrosilylation catalyst; and
   D) optionally, a filler.

2. The method as set forth in claim 1, wherein the 3D printer is selected from the group of powder-bed 3D printers, inkjet 3D printers, extrusion 3D printers, light-polymerized 3D printers, or combinations thereof.

3. A method of forming a three-dimensional (3D) article, said method comprising the steps of:
   I) printing a first photocurable silicone composition with a 3D printer to form a layer;
   II) irradiating the layer with an energy source to form an at least partially cured layer;
   III) printing a second photocurable silicone composition on the at least partially cured layer with the 3D printer to form a subsequent layer; and
   IV) irradiating the subsequent layer with the energy source to form an at least partially cured subsequent layer; and
   V) optionally, repeating steps III) and IV) with independently selected photocurable silicone compositions for any additional layer(s) to form the 3D article;
   wherein the first and second photocurable silicone compositions are the same as or different from one another;
   wherein the 3D printer comprises at least one of a powder-bed 3D printer, an extrusion 3D printer, or a light-polymerized 3D printer; and
   wherein at least one of the photocurable silicone compositions comprises:
      A) an organosilicon compound having an average of at least two silicon-bonded ethylenically unsaturated groups per molecule, wherein:
         i) ethylenically unsaturated moieties of the silicon-bonded ethylenically unsaturated groups are separated by at least four atoms, and/or
         ii) component A) also has at least one silicon-bonded phenyl group per molecule and a silicon atom bearing an ethylenically unsaturated group and a silicon atom bearing a phenyl group are separated by only an oxygen atom;
      B) an organosilicon compound having an average of at least two silicon-bonded hydrogen atoms per molecule in an amount sufficient to cure the photocurable silicone composition; and
      C) a catalytic amount of a photoactivated hydrosilylation catalyst; and
      D) optionally, a filler.

4. The method as set forth in claim 1, wherein the energy source emits at least one of ultraviolet (UV) radiation, infrared (IR) radiation, visible light, X-rays, gamma rays, or electron beams, alternatively at least UV radiation.

5. The method as set forth in claim 1, wherein the photocurable silicone composition comprises:
   A) the organosilicon compound having an average of at least two silicon-bonded ethylenically unsaturated groups per molecule, wherein ethylenically unsaturated moieties of the silicon-bonded ethylenically unsaturated groups are separated by at least four atoms.

6. The method as set forth in claim 1, wherein the photocurable silicone composition comprises:
   A) the organosilicon compound having an average of at least two silicon-bonded ethylenically unsaturated groups and at least one silicon-bonded phenyl group per molecule, wherein a silicon atom bearing an ethylenically unsaturated group and a silicon atom bearing a phenyl group are separated by only an oxygen atom.

7. The method as set forth in claim 5, wherein component D) is present in an amount of at least about 5, alternatively at least about 25, alternatively at least about 50, alternatively at least about 75, parts by weight based on 100 parts by weight of the photocurable silicone composition.

8. The method as set forth in claim 1, wherein the first and second photocurable silicone compositions are the same.

9. A 3D article formed according to the method as set forth in claim 1.

10. A photocurable silicone composition for three-dimensional (3D) printing, said photocurable silicone composition comprising:
   A) an organosilicon compound having an average of at least two silicon-bonded ethylenically unsaturated groups per molecule;
   B) an organosilicon compound having an average of at least two silicon-bonded hydrogen atoms per molecule in an amount sufficient to cure said photocurable silicone composition; and
   C) a catalytic amount of a photoactivated hydrosilylation catalyst; and
   D) optionally, a filler;
   wherein at least one of the following conditions is true:
      I) ethylenically unsaturated moieties of said silicon-bonded ethylenically unsaturated groups of component A) are separated by at least four atoms; or
      II) component A) also has at least one silicon-bonded phenyl group per molecule and a silicon atom bearing an ethylenically unsaturated group and a silicon atom bearing a phenyl group of component A) are separated by only an oxygen atom.

11. The composition as set forth in claim 10, wherein component B) is selected from the group of organohydrogensiloxanes, organohydrogensilanes, or combinations thereof.

12. The composition as set forth in claim 10, wherein:
   i) component A) is selected from the group of polysiloxanes, polysilanes, polycarbosilanes, polycarbosiloxanes, or combinations thereof;
   ii) said silicon-bonded ethylenically unsaturated groups of component A) are alkenyl groups, alternatively are vinyl groups; or
   iii) both i) and ii).

13. The composition as set forth in claim 10, wherein component A) is a polysiloxane of average formula A1):

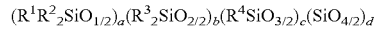

$(R^1R^2{}_2SiO_{1/2})_a(R^3{}_2SiO_{2/2})_b(R^4SiO_{3/2})_c(SiO_{4/2})_d$     A1);

where each of $R^1$, $R^2$, $R^3$, and $R^4$ is an independently selected substituted or unsubstituted hydrocarbyl group, $0 \le a \le 0.80$, $0 \le b \le 1.00$, $0 \le c \le 0.85$, and $0 \le d \le 0.85$, provided that a, b, c, and d are not simultaneously 0 and $a+b+c+d=1$.

14. The composition as set forth in claim 13, wherein:
   i) component A) has a viscosity less than 1,000,000 centistokes at 25° C.;
   ii) $0.10 \le a \le 0.80$, $0 \le b \le 1.00$, $0 < c \le 0.75$, and $0 \le d \le 0.50$; or
   iii) both i) and ii).

15. The composition as set forth in claim 13, wherein:
   i) $R^1$ is an alkenyl group, alternatively a vinyl group, a=0.75 or 0.67, c=0.25 or 0, b=0 or 0.33, and d=0; and/or
   ii) $R^2$ is a methyl group; and/or
   iii) $R^3$ is a methyl group; and/or
   iv) $R^4$ is a phenyl group.

16. The composition as set forth in claim 10, wherein component D) is present in an amount of at least about 5, alternatively at least about 25, alternatively at least about 50, alternatively at least about 75, parts by weight based on 100 parts by weight of the photocurable silicone composition.

17. The composition as set forth in claim 10, further defined as a multi-part photocurable silicone composition, wherein component A) is in a first part, component B) is in a second part separate from said first part, and component C) is in said first part, in said second part, and/or in a third part separate from said first and second parts.

18. A 3D article comprising the reaction product of the composition as set forth in claim 10.

19. The method as set forth in claim 1, wherein component D) is present in an amount of at least about 5, alternatively at least about 25, alternatively at least about 50, alternatively at least about 75, parts by weight based on 100 parts by weight of the photocurable silicone composition.

20. The method as set forth in claim 3, wherein component D) is present in an amount of at least about 5, alternatively at least about 25, alternatively at least about 50, alternatively at least about 75, parts by weight based on 100 parts by weight of the photocurable silicone composition.

* * * * *